(12) United States Patent
Sinclair et al.

(10) Patent No.: US 8,166,267 B2
(45) Date of Patent: Apr. 24, 2012

(54) MANAGING A LBA INTERFACE IN A DIRECT DATA FILE MEMORY SYSTEM

(75) Inventors: Alan W. Sinclair, Falkirk (GB); Barry Wright, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 151 days.

(21) Appl. No.: 11/616,226

(22) Filed: Dec. 26, 2006

(65) Prior Publication Data

US 2008/0155227 A1    Jun. 26, 2008

(51) Int. Cl.
*G06F 12/02* (2006.01)

(52) U.S. Cl. ........ 711/165; 711/103; 711/161; 711/162; 711/203

(58) Field of Classification Search .................. 711/165, 711/103, 161, 162, 203
See application file for complete search history.

(56) References Cited

U.S. PATENT DOCUMENTS

| | | | |
|---|---|---|---|
| 5,454,103 A | 9/1995 | Coverston | |
| 5,570,315 A | 10/1996 | Tanaka et al. | |
| 5,602,987 A | 2/1997 | Harari et al. | |
| 5,619,690 A | 4/1997 | Matsumani et al. | |
| 5,659,704 A | 8/1997 | Burkes et al. | |
| 5,737,742 A | 4/1998 | Achiwa et al. | |
| 5,765,211 A | 6/1998 | Luck | |
| 5,774,397 A | 6/1998 | Endoh et al. | |
| 5,809,558 A | 9/1998 | Matthews et al. | |
| 5,832,493 A | 11/1998 | Marshall et al. | |
| 5,890,222 A * | 3/1999 | Agarwal et al. | 711/220 |
| 5,930,825 A | 7/1999 | Nakashima et al. | |
| 6,038,636 A * | 3/2000 | Brown et al. | 711/103 |
| 6,046,935 A | 4/2000 | Takeuchi et al. | |
| 6,373,746 B1 | 4/2002 | Takeuchi et al. | |
| 6,426,893 B1 | 7/2002 | Conley et al. | |
| 6,456,528 B1 | 9/2002 | Chen | |
| 6,522,580 B2 | 2/2003 | Chen et al. | |
| 6,643,188 B2 | 11/2003 | Tanaka et al. | |
| 6,763,424 B2 | 7/2004 | Conley | |

(Continued)

FOREIGN PATENT DOCUMENTS

EP    1 496 437 A1    1/2005

(Continued)

OTHER PUBLICATIONS

EPO/ISA, "Notification of Transmittal of the International Search Report and the Written Opinion of the International Searching Authority, or the Declaration," corresponding International Application No. PCT/US2007/088165, mailed on Jun. 3, 2008, 14 pages.

(Continued)

*Primary Examiner* — Jae Yu
(74) *Attorney, Agent, or Firm* — Davis Wright Tremaine LLP

(57) ABSTRACT

Data files are assigned addresses within one or more logical blocks of a continuous logical address space interface (LBA interface) of a usual type of flash memory system with physical memory cell blocks. This assignment may be done by the host device which typically, but not necessarily, generates the data files. The number of logical blocks containing data of any one file is controlled in a manner that reduces the amount of fragmentation of file data within the physical memory blocks, thereby to maintain good memory performance. The host may configure the logical blocks of the address space in response to learning the physical characteristics of a memory to which it is connected.

4 Claims, 26 Drawing Sheets

U.S. PATENT DOCUMENTS

| | | | |
|---|---|---|---|
| 6,771,536 B2 | 8/2004 | Li et al. | |
| 6,781,877 B2 | 8/2004 | Cernea et al. | |
| 6,839,823 B1 | 1/2005 | See et al. | |
| 6,925,007 B2 | 8/2005 | Harari et al. | |
| 7,051,176 B2* | 5/2006 | Meiri et al. | 711/163 |
| 7,065,630 B1 | 6/2006 | Ledebohm et al. | |
| 7,139,864 B2 | 11/2006 | Bennett et al. | |
| 7,143,445 B1* | 11/2006 | Ishiguro et al. | 726/31 |
| 7,277,978 B2 | 10/2007 | Khatami | |
| 7,389,393 B1 | 6/2008 | Karr et al. | |
| 7,546,588 B2 | 6/2009 | Dickenson | |
| 2002/0112116 A1 | 8/2002 | Nelson | |
| 2003/0065899 A1 | 4/2003 | Gorobets | |
| 2003/0115414 A1* | 6/2003 | Tomita | 711/114 |
| 2003/0131278 A1* | 7/2003 | Fujibayashi | 714/6 |
| 2003/0147278 A1 | 8/2003 | Tanaka et al. | |
| 2003/0225961 A1 | 12/2003 | Chow et al. | |
| 2005/0036372 A1 | 2/2005 | Sasaki | |
| 2005/0080994 A1 | 4/2005 | Cohen et al. | |
| 2005/0141312 A1 | 6/2005 | Sinclair et al. | |
| 2005/0141313 A1 | 6/2005 | Gorobets et al. | |
| 2005/0144357 A1 | 6/2005 | Sinclair | |
| 2005/0144358 A1 | 6/2005 | Conley et al. | |
| 2005/0144363 A1 | 6/2005 | Sinclair | |
| 2005/0144365 A1 | 6/2005 | Gorobets et al. | |
| 2005/0144367 A1 | 6/2005 | Sinclair | |
| 2005/0166087 A1 | 7/2005 | Gorobets | |
| 2006/0004950 A1 | 1/2006 | Wang et al. | |
| 2006/0020744 A1 | 1/2006 | Sinclair et al. | |
| 2006/0020745 A1 | 1/2006 | Conley et al. | |
| 2006/0031593 A1 | 2/2006 | Sinclair | |
| 2006/0101219 A1 | 5/2006 | Mita | |
| 2006/0155920 A1 | 7/2006 | Smith et al. | |
| 2006/0155921 A1 | 7/2006 | Gorobets et al. | |
| 2006/0155922 A1 | 7/2006 | Gorobets et al. | |
| 2006/0161722 A1 | 7/2006 | Bennett et al. | |
| 2006/0161726 A1 | 7/2006 | Lasser | |
| 2006/0161728 A1 | 7/2006 | Bennett et al. | |
| 2006/0184718 A1 | 8/2006 | Sinclair et al. | |
| 2006/0184719 A1 | 8/2006 | Sinclair | |
| 2006/0184720 A1 | 8/2006 | Sinclair et al. | |
| 2006/0184722 A1 | 8/2006 | Sinclair | |
| 2006/0184723 A1 | 8/2006 | Sinclair et al. | |
| 2006/0271735 A1 | 11/2006 | Klein et al. | |
| 2007/0030734 A1 | 2/2007 | Sinclair et al. | |
| 2007/0033323 A1 | 2/2007 | Gorobets | |
| 2007/0033324 A1 | 2/2007 | Sinclair | |
| 2007/0033325 A1 | 2/2007 | Sinclair | |
| 2007/0033326 A1 | 2/2007 | Sinclair | |
| 2007/0033327 A1 | 2/2007 | Sinclair | |
| 2007/0033328 A1 | 2/2007 | Sinclair et al. | |
| 2007/0033329 A1 | 2/2007 | Sinclair et al. | |
| 2007/0033330 A1 | 2/2007 | Sinclair et al. | |
| 2007/0033331 A1 | 2/2007 | Sinclair et al. | |
| 2007/0033332 A1 | 2/2007 | Sinclair et al. | |
| 2007/0033373 A1 | 2/2007 | Sinclair | |
| 2007/0033374 A1 | 2/2007 | Sinclair et al. | |
| 2007/0033375 A1 | 2/2007 | Sinclair et al. | |
| 2007/0033376 A1 | 2/2007 | Sinclair et al. | |
| 2007/0033377 A1 | 2/2007 | Sinclair et al. | |
| 2007/0033378 A1 | 2/2007 | Sinclair et al. | |
| 2007/0086260 A1 | 4/2007 | Sinclair | |
| 2007/0088904 A1 | 4/2007 | Sinclair | |
| 2007/0136553 A1 | 6/2007 | Sinclair | |
| 2007/0136555 A1 | 6/2007 | Sinclair | |
| 2007/0143532 A1 | 6/2007 | Gorobets et al. | |
| 2007/0143570 A1 | 6/2007 | Gorobets et al. | |
| 2007/0143571 A1 | 6/2007 | Sinclair et al. | |
| 2007/0186032 A1 | 8/2007 | Sinclair et al. | |
| 2007/0239927 A1 | 10/2007 | Rogers | |
| 2008/0154985 A1 | 6/2008 | Childs | |
| 2008/0155175 A1 | 6/2008 | Sinclair et al. | |
| 2008/0155176 A1 | 6/2008 | Sinclair et al. | |
| 2008/0155177 A1 | 6/2008 | Sinclair et al. | |
| 2008/0155178 A1 | 6/2008 | Sinclair et al. | |
| 2008/0155228 A1 | 6/2008 | Sinclair et al. | |
| 2008/0273437 A1 | 11/2008 | Ijtsma et al. | |

FOREIGN PATENT DOCUMENTS

| | | |
|---|---|---|
| WO | WO 03/073293 A2 | 9/2003 |
| WO | WO 03/073293 A3 | 9/2003 |
| WO | WO 2005/066793 A2 | 7/2005 |
| WO | WO 2005/066793 A3 | 7/2005 |
| WO | WO 2006/133597 A1 | 12/2006 |
| WO | WO 2007/019155 A1 | 2/2007 |
| WO | WO 2007/019197 A2 | 2/2007 |
| WO | WO 2007/019197 A3 | 2/2007 |

OTHER PUBLICATIONS

EPO/ISA, "Notification of Transmittal of the International Search Report and the Written Opinion of the International Searching Authority, or the Declaration," corresponding International Application No. PCT/US2007/088180, mailed on Jun. 5, 2008, 13 pages.

USPTO, "Office Action," mailed in related U.S. Appl. No. 11/616,236 on Jun. 18, 2008, 26 pages.

EPO/ISA, "Notification of Transmittal of the International Search Report and the Written Opinion of the International Searching Authority, or the Declaration," corresponding International Application No. PCT/US2007/088172, mailed on Jul. 30, 2008, 12 pages.

USPTO, "Office Action," mailed in related U.S. Appl. No. 11/616,231 on May 13, 2009, 25 pages.

USPTO, "Office Action," mailed in related U.S. Appl. No. 11/616,228 on May 20, 2009, 27 pages.

USPTO, "Office Action," mailed in related U.S. Appl. No. 11/616,218 on May 29, 2009, 23 pages.

USPTO, "Office Action," mailed in related U.S. Appl. No. 11/616,231 on Dec. 28, 2009, 10 pages.

"Logical Block Addressing (LBA) Defined", Dec. 17, 2000, http://support.microsoft.com/kb/122052.

USPTO, "Office Action", mailed in U.S. Appl. No. 11/616,228 on Mar. 30, 2010, 17 pages.

USPTO, "Office Action", mailed in related U.S. Appl. No. 11/616,218 on Mar. 30, 2010, 14 pages.

"Logical Block Addressing" http://en.wikipedia.org/wiki/Logical_block_addressing, Dec. 30, 2009.

"Logical Block Addressing (LBA)" http://www.pcguide.com/ref/hdd/bios/modesLBA-c.html, Apr. 17, 2001.

USPTO, "Office Action," mailed in U.S. Appl. No. 11/616,231 on Sep. 8, 2010, 13 pages.

Office Action for European Patent Application No. 07 869 536.8 dated Dec. 27, 2010, 3 pages.

Office Action for U.S. Appl. No. 11/616,231, mailed Dec. 21, 2010, 10 pages.

Office Action for Chinese Patent Application No. 200780048434.7 mailed Feb. 17, 2011, 15 pages.

Office Action for U.S. Appl. No. 11/616,218 mailed Mar. 22, 2011, 15 pages.

Listing of Claims for European Patent Application No. 07 869 536.8, filed Dec. 19, 2007, 5 pages.

Office Action for U.S. Appl. No. 11/616,218 mailed Nov. 1, 2011, 12 pages.

Logical Block Addressing (LBA), http://www.pcguide.com/ref/hd/bios/modesLBA-c.html, Apr. 17, 2001, 2 pages.

Office Action for U.S. Appl. No, 11/616,231 mailed Jul. 12, 2011, 11 pages.

Second Office Action for Chinese Patent Application No. 200780048434.7 dated Aug. 2, 2011, 14 pages.

List of Pending Claims for Chinese Patent Application No. 200780048434.7 filed Dec. 19, 2007, 5 pages.

Final Office Action for U.S. Appl. No. 11/616,231 mailed. Dec. 19, 2011, 16 pages.

Office Action for U.S. Appl. No. 11/616,218 mailed Mar. 5, 2012, 11 pages.

Notice of Allowance for U.S. Appl. No. 11/616,231 mailed Mar. 5, 2012, 9 pages.

* cited by examiner

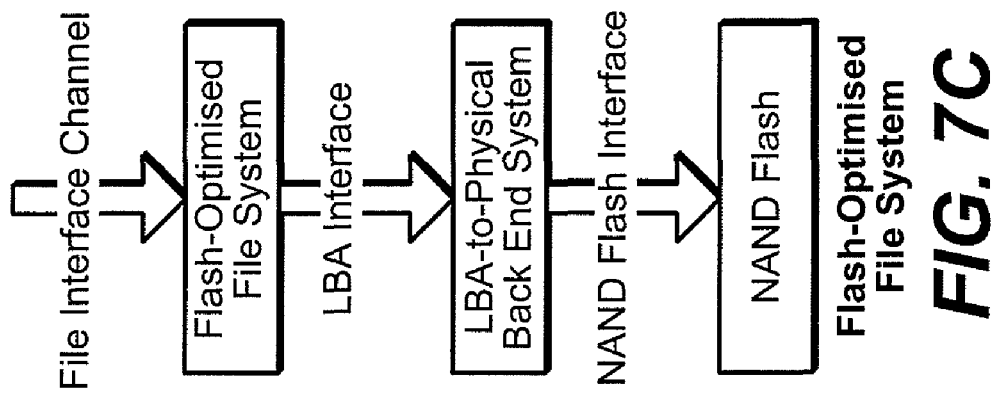
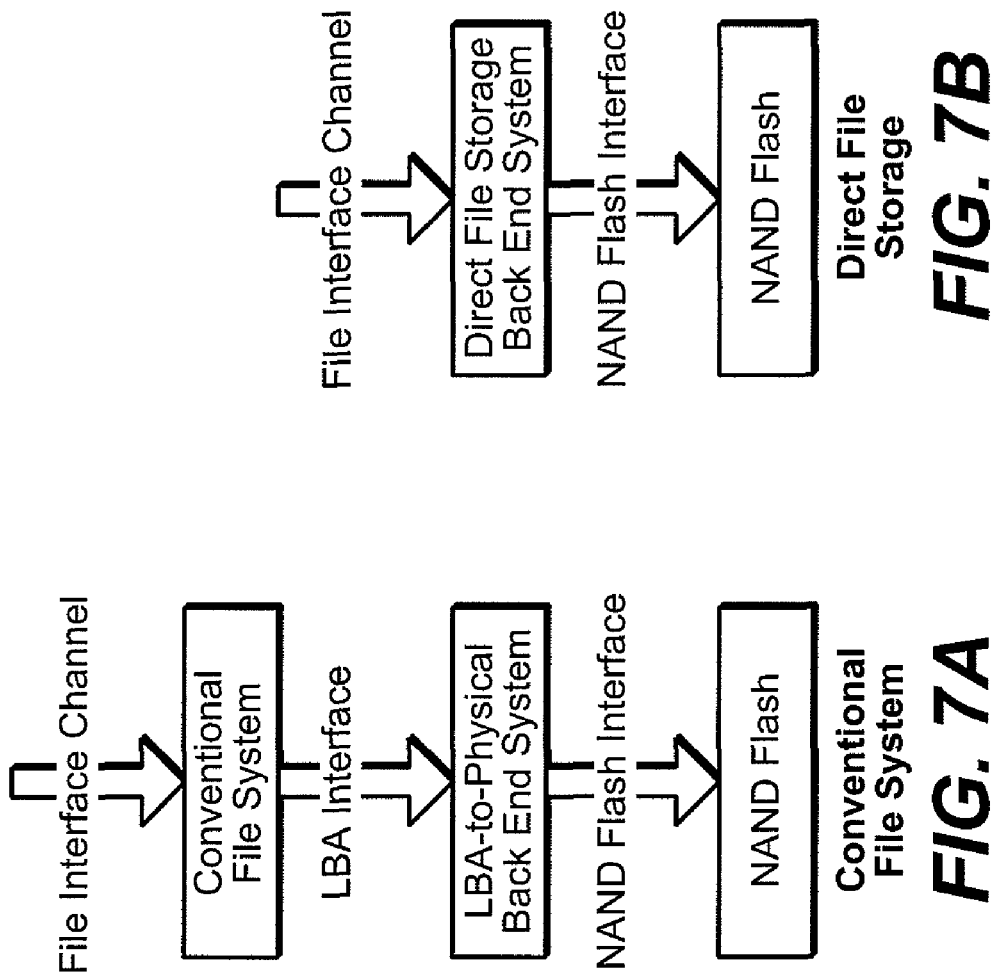

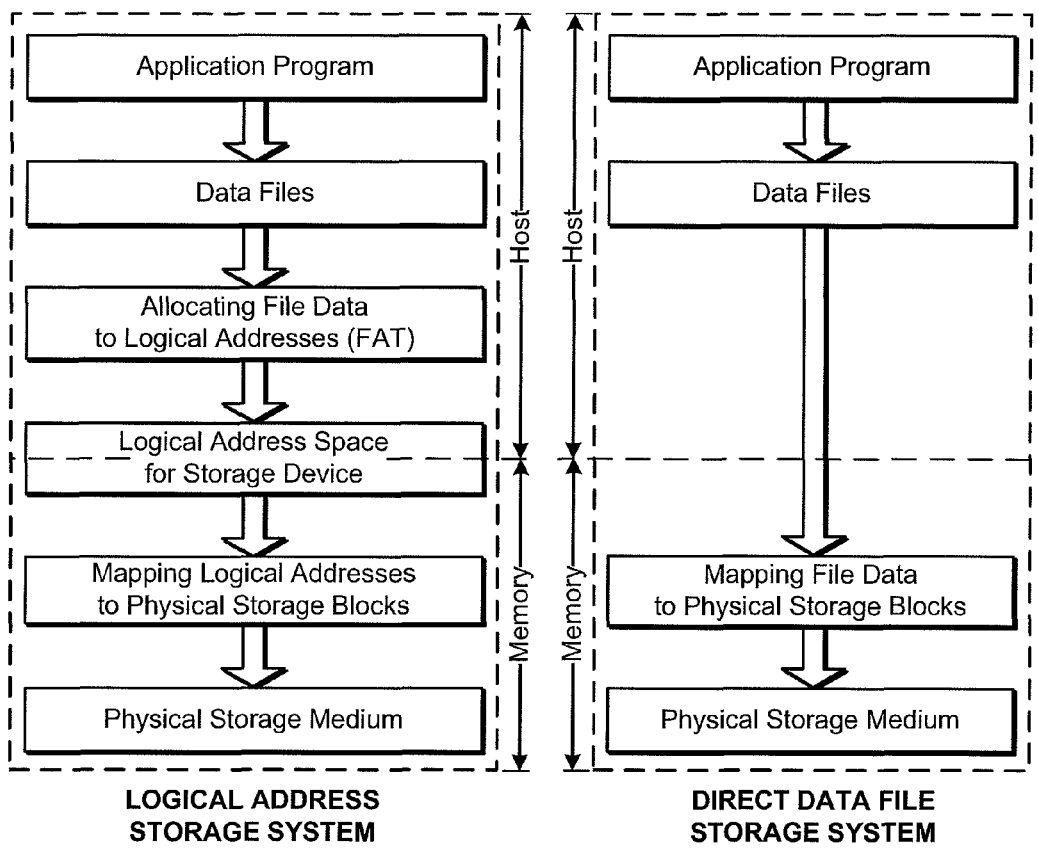
FIG. 8A — LOGICAL ADDRESS STORAGE SYSTEM
FIG. 8B — DIRECT DATA FILE STORAGE SYSTEM

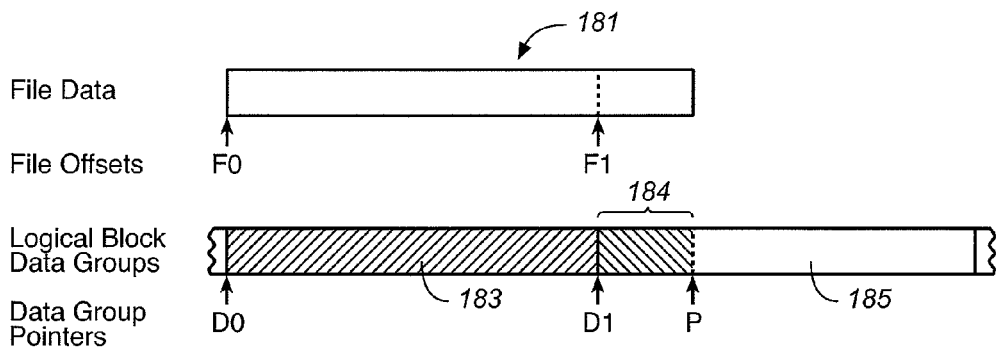
FIG. 13A Write
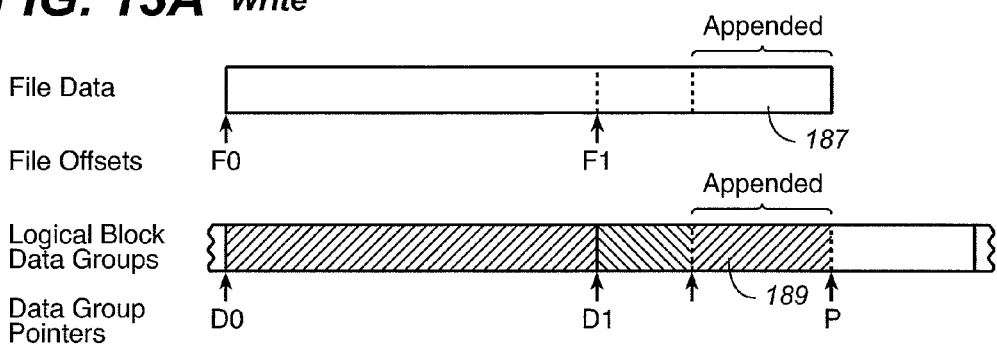
FIG. 13B Write
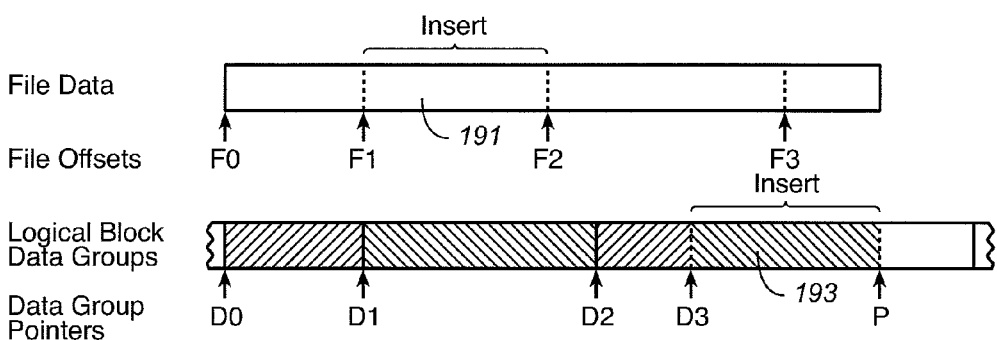
FIG. 13C Insert
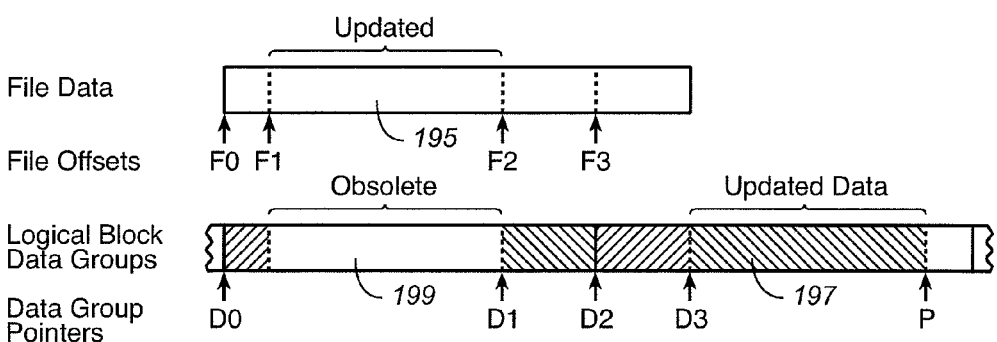
FIG. 13D Update

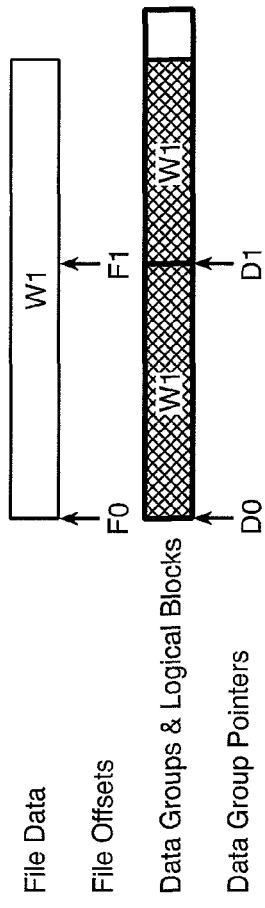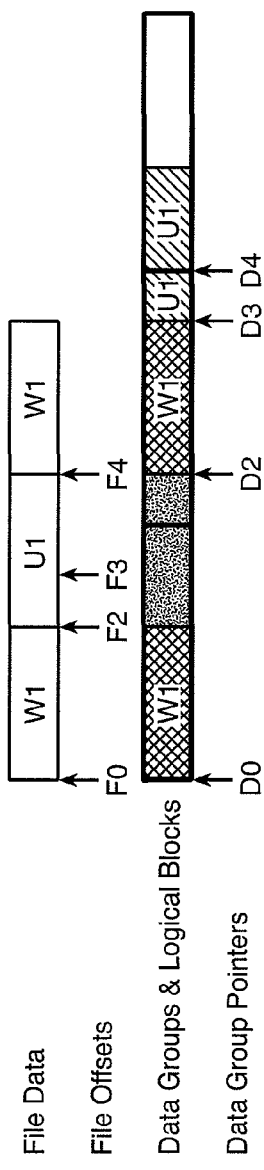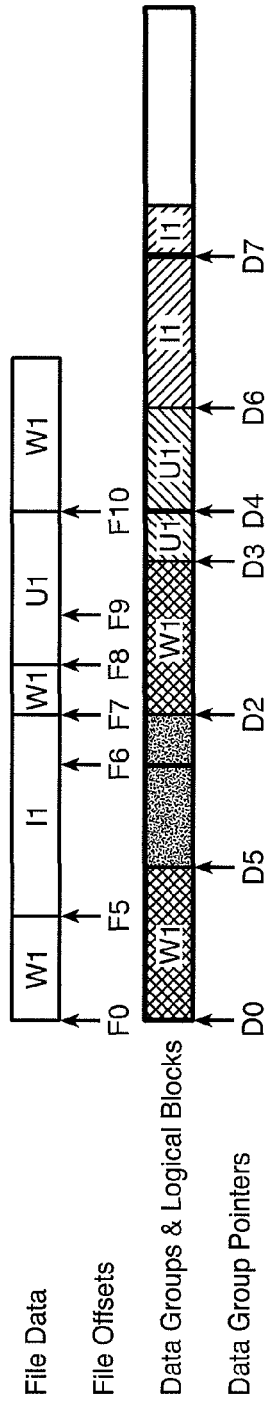
FIG. 14A Write  FIG. 14B Update  FIG. 14C Insert

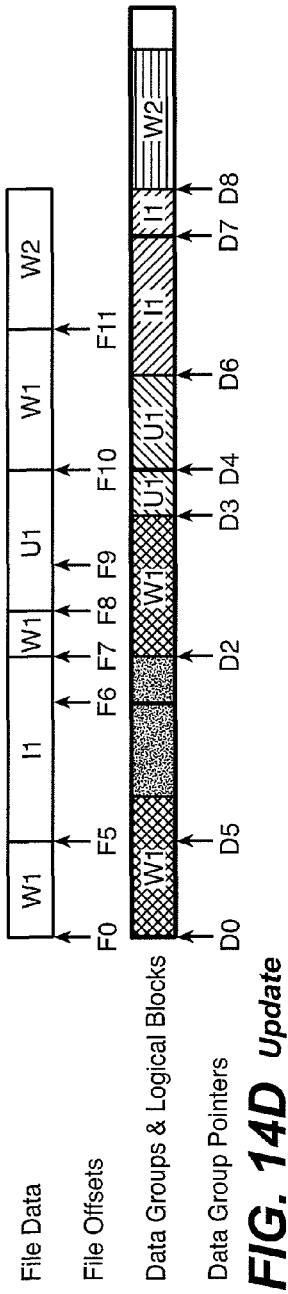
FIG. 14D Update
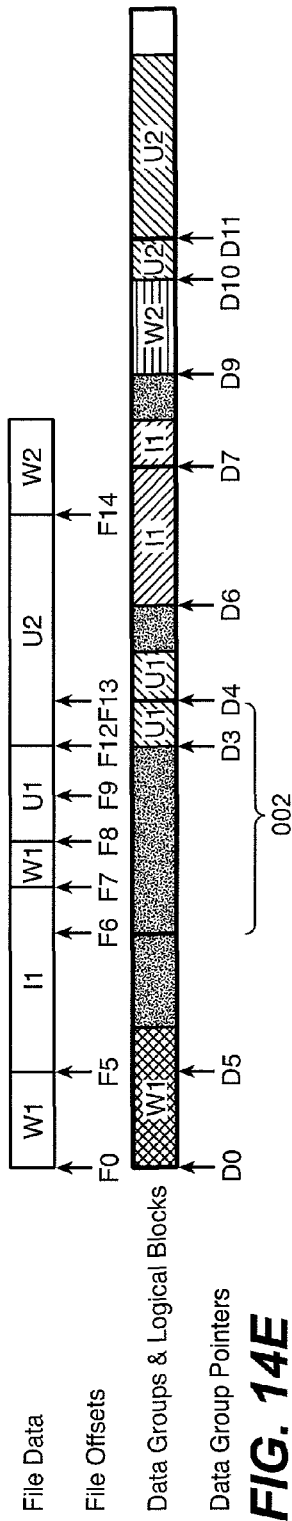
FIG. 14E
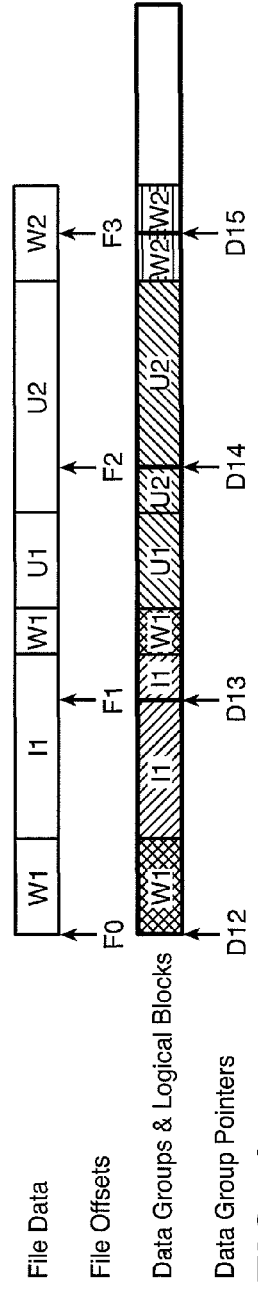
FIG. 15

Permitted File States

| File State | Fractal Blocks | |
| --- | --- | --- |
| | Full Common Block | Partial Block |
| 00 | None | None |
| 01 | None | Program Block |
| 02 | None | Common Block |
| 10 | Full Common Block | None |
| 11 | Full Common Block | Program Block |
| 12 | Full Common Block | Common Block |
| 20 | Two Full Common Blocks | None |

File State Transitions Due to Programming Data

File State Transitions Due to Programmed Data

| State Transition | Triggering Event | Description |
|---|---|---|
| 00 to 01 | Erased block allocated as the active block | An erased block is allocated as the program block for programming data of unknown length for a file or when a partial block is not available. |
| 00 to 02 | Partial block allocated as the active block | A partial block is selected from the partial block list for programming data of known length for a file. It becomes a common block for the file. |
| 01 to 00 | Program block becomes full | The program block for a file has become full and is designated as a file block. The file then has no active block. |
| 01 to 02 | Partial block allocated as active block for another file | The program block for a file is selected from the partial block list for programming data of known length for another file. It becomes the common block for the file. |
| 02 to 10 | Common block becomes full | The common block for a file has become full and is designated a full common block. The file then has no active block. |
| 10 to 11 | Erased block allocated as the active block | An erased block is allocated as the program block for programming data of unknown length for a file or when a partial block is not available. |
| 10 to 12 | Partial block allocated as the active block | A partial block is selected from the partial block list for progamming data of known length for a file. It becomes a common block for the file. |
| 11 to 10 | Active program block becomes full | The program block for a file has become full and is designated as a file block. The file then has no active block. |
| 11 to 12 | Program block allocated as active block for another file | The program block for a file is selected from the partial block list for programming data of known length for another file. It becomes the common block for the file. |
| 12 to 20 | Common block becomes full | The common block for a file has become full and is designated a second full common block. The file then has no active block. |
| 20 to 11 | Erased block allocated as the active block | An erased block is to be allocated as the program block for a file. The file already contains two fractal blocks, and another cannot be allocated. The state transition therefore must incorporate a data transition, in which the erased block is allocated and all data for the file is moved to it from the one full common block. It becomes the program block for the file. The data transition must be completed as a single operation before the state transition can be considered complete. |
| 20 to 12 | Partial block allocated as the active block | A partial block is to be allocated as the common block for a file. The file already contains two fractal blocks, and another cannot be allocated. The state transition therefore must incorporate a data transition, in which the partial block is allocated and all data for the file is moved to it from one full common block. It becomes the common block for the file. The data transition must be completed as a single operation before the state transition can be considered complete. |

*FIG. 19*

File State Transitions Due to Obsolete Data

File State Transitions Due to Obsolete Data

| State Transition | Description |
|---|---|
| 01 to 00 | All data for the file in the program block has been deleted by the host and has become obsolete. |
| 02 to 00 | All data for the file in the common block has become obsolete. |
| 02 to 01 | All data for other files in the common block has become obsolete. The common block becomes a program block. |
| 10 to 00 | Case 1 |
| | All data for the file in the full common block has become obsolete. |
| 10 to 00 | Case 2 |
| | All data for other files in the full common block has become obsolete. The full common block becomes a file block. |
| 11 to 01 | Case 1 |
| | All data for the file in the full common block has become obsolete. |
| 11 to 01 | Case 2 |
| | All data for other files in the full common block has become obsolete. The full common block becomes a file block. |
| 11 to 10 | All data for the file in the program block has been deleted by the host and has become obsolete. |
| 12 to 02 | Case 1 |
| | All data for the file in the full common block has become obsolete. |
| 12 to 02 | Case 2 |
| | All data for other files in the full common block has become obsolete. The full common block becomes a file block. |
| 12 to 10 | All data for the file in the common block has become obsolete. |
| 12 to 11 | All data for other files in the common block has become obsolete. The common block becomes a program block. |
| 20 to 10 | Case 1 |
| | All data for the file in one full common block has become obsolete. |
| 20 to 10 | Case 2 |
| | All data for other files in one full common block has become obsolete. The full common block becomes a file block. |

*FIG. 21*

File State Transitions Due to Reclaim Block Selection

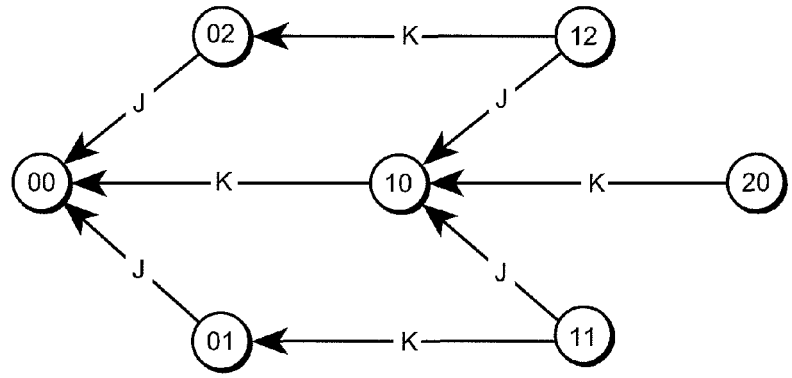

*FIG. 22*

File State Transitions Due to Reclaim Block Selection

| State Transition | Description |
|---|---|
| 01 to 00 | Program block selected as reclaim block. |
| 02 to 00 | Common block selected as reclaim block. |
| 10 to 00 | Full common block selected as reclaim block. |
| 11 to 01 | Full common block selected as reclaim block. |
| 11 to 10 | Program block selected as reclaim block. |
| 12 to 02 | Full common block selected as reclaim block. |
| 12 to 10 | Common block selected as reclaim block. |
| 20 to 10 | Full common block selected as reclaim block. |

*FIG. 23*

Alignment of Files to Beginning of Blocks

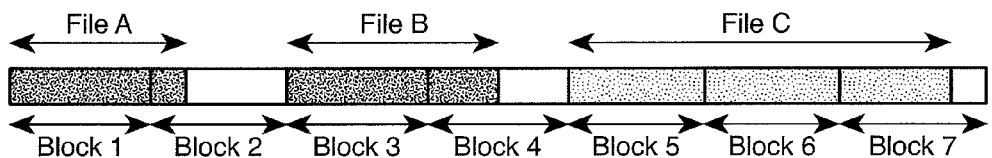

*FIG. 24*

Allocation of Active Blocks When Files Aligned to Beginning of Blocks

| Allocation Case | Existing File State | Prevailing Condition | Order of Priority for Block Type to be Allocated |
|---|---|---|---|
| A | 00 | Data of unknown length or known length greater than a block to be programmed | 1. Erased block<br>2. Biggest partial block |
| B | 00 | Data of known length less than a block to be programmed | 1. Best fit partial block<br>2. Biggest partial block<br>3. Erased block |
| C | 10 | Data of unknown length or known length greater than a block to be programmed | 1. Erased block<br>2. Biggest partial block |
| D | 10 | Data of known length less than a block to be programmed | 1. Best fit partial block<br>2. Erased block |
| E | 20 | Aggregate data of unknown length or known length greater than a block to be programmed, where aggregate data is the sum of data to be relocated during data transition and data to be programmed from another source | 1. Erased block |
| F | 20 | Aggregate data of known length less than a block to be programmed, where aggregate data is the sum of data to be relocated during data transition and data to be programmed from another source | 1. Best fit partial block<br>2. Erased block |

*FIG. 25*

Abutting of Files Within Blocks

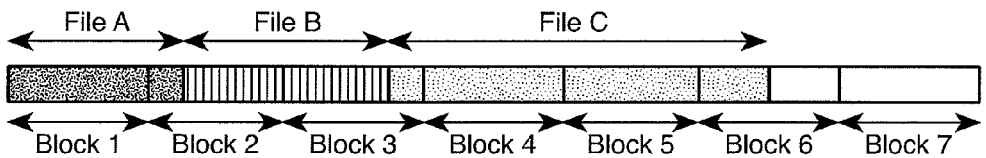

FIG. 26

Allocation of Active Blocks for Abutting of Files Within Blocks

| Allocation Case | Existing File State | Prevailing Condition | Order of Priority for Block Type to be Allocated |
|---|---|---|---|
| A1 | 00 | Data for a new file of unknown length or known length greater than a block to be programmed.<br><br>Start of file to abut other data within a block. | 1. Biggest partial block<br>2. Erased block |
| A2 | 00 | Data for an existing file of unknown length or known length greater than a block to be programmed | 1. Erased block<br>2. Biggest partial block |
| B | 00 | Data of known length less than a block to be programmed | 1. Best fit partial block<br>2. Biggest partial block<br>3. Erased block |
| C | 10 | Data of unknown length or known length greater than a block to be programmed | 1. Erased block<br>2. Biggest partial block |
| D | 10 | Data of known length less than a block to be programmed | 1. Best fit partial block<br>2. Erased block |
| E | 20 | Aggregate data of unknown length or known length greater than a block to be programmed, where aggregate data is the sum of data to be relocated during data transition and data to be programmed from another source | 1. Erased block |
| F | 20 | Aggregate data of known length less than a block to be programmed, where aggregate data is the sum of data to be relocated during data transition and data to be programmed from another source | 1. Best fit partial block<br>2. Erased block |

FIG. 27

| Block Type | Block Contents | | | Block List |
|---|---|---|---|---|
| | Valid Data (V) | Erased Capacity (E) | Obsolete Data (O) | |
| Program | Yes | Yes | Don't Care | Partial |
| Common | Yes | Yes | Don't Care | Partial |
| Full Common | Yes | No | No | None |
| | | | Yes | Obsolete |
| File | Yes | No | No | None |
| | | | Yes | Obsolete |
| Invalid | No | Yes | Yes | Obsolete |
| Erased | No | Yes | No | Erased |

U.S. 8,166,267 B2

MANAGING A LBA INTERFACE IN A DIRECT DATA FILE MEMORY SYSTEM

CROSS-REFERENCE TO PREVIOUSLY FILED RELATED APPLICATIONS

Reference is made to the following United States patent applications pertaining to direct data file storage in flash memory systems:

1) Ser. No. 11/060,249, entitled "Direct Data File Storage in Flash Memories" (publication no. 2006-0184720 A1), Ser. No. 11/060,174, entitled "Direct File Data Programming and Deletion in Flash Memories" (publication no. 2006-0184718 A1), and Ser. No. 11/060,248, entitled "Direct Data File Storage Implementation Techniques in Flash Memories" (publication no. 2006-0184719 A1), all filed Feb. 16, 2005, and related applications Ser. No. 11/342,170 (publication no. 2006-0184723 A1) and Ser. No. 11/342,168 (publication no. 2006-0184722 A1), both filed Jan. 26, 2006;

2) No. 60/705,388, filed Aug. 3, 2005, Ser. No. 11/461,997, entitled "Data Consolidation and Garbage Collection in Direct Data File Storage in Flash Memories" (publication no. 2007-0033376 A1), Ser. No. 11/462,007, entitled "Data Operations in Flash Memories Utilizing Direct Data File Storage" (publication no. 2007-0033377 A1), and related applications Ser. No. 11/462,001 (publication no. 2007-0186032 A1), and Ser. No. 11/462,013 (publication no. 2007-0033378 A1), all filed Aug. 2, 2006.

3) Ser. No. 11/196,869, filed Aug. 3, 2005, entitled "Interfacing Systems Operating Through a Logical Address Space and on a Direct Data File Basis" (publication no. 2007-0033323 A1).

4) Ser. No. 11/196,168, filed Aug. 3, 2005, entitled "Method and System for Dual Mode Access for Storage Devices" publication no. 2007-0033373 A1).

5) Ser. No. 11/250,299, entitled "Method of Storing Transformed Units of Data in a Memory System Having Fixed Sized Storage Blocks" (publication no. 2007-0086260 A1), and related application Ser. No. 11/250,794 (publication no. 2007-0088904 A1), both filed Oct. 13, 2005.

6) Ser. No. 11/259,423, entitled "Scheduling of Reclaim Operations in Non-Volatile Memory" (publication no. 2007-0033324 A1), and related application Ser. No. 11/259,439 (publication no. 2007-0033325 A1), both filed Oct. 25, 2005.

7) Ser. No. 11/302,764, entitled "Logically-Addressed File Storage Methods" (publication no. 2007-0136555 A1) and related application Ser. No. 11/300,568 (publication no. 2007-01366553 A1), both filed Dec. 13, 2005.

8) Ser. No. 11/316,577, entitled "Enhanced Host Interfacing Methods" (publication no. 2007-0033326 A1), and related application Ser. No. 11/316,578 (publication no. 2007-0033327 A1), both filed Dec. 21, 2005.

9) Ser. No. 11/314,842, filed Dec. 21, 2005, entitled "Dual Mode Access for Non-Volatile Storage Devices" (publication no. 2007-0143571 A1).

10) Ser. No. 11/313,567, entitled "Method and System for Accessing Non-Volatile Storage Devices" (publication no. 2007-0143532 A1), and related application Ser. No. 11/313,633 (publication no. 2007-0143570 A1), both filed Dec. 21, 2005.

11) Ser. No. 11/382,224, entitled "Management of Memory Blocks that Directly Store Data Files" (publication no. 2007-0033328 A1), and related application Ser. No. 11/382,228 (publication no. 2007-0033329 A1), both filed May 8, 2006.

12) Ser. No. 11/382,232, entitled "Reclaiming Data Storage Capacity in Flash Memories" (publication no. 2007-0030734 A1), and related application Ser. No. 11/382,235 (publication no. 2007-0033330 A1), both filed May 8, 2006.

13) No. 60/746,742, filed May 8, 2006, Ser. No. 11/459,255, entitled "Indexing of File Data in Reprogrammable Non-Volatile Memories that Directly Store Data Files" (publication no. 2007-0033375 A1), and related application Ser. No. 11/459,246 (publication no. 2007-0033374 A1), both filed Jul. 21, 2006.

14) No. 60/746,740, filed May 8, 2006, Ser. No. 11/459,268 entitled "Methods of Managing Blocks in Nonvolatile Memory" (publication no. 2007-0033332 A1), and related application Ser. No. 11/459,260 (publication no. 2007-0033331 A1), both filed Jul. 21, 2006.

CROSS-REFERENCE TO CONCURRENTLY FILED RELATED APPLICATIONS

The following applications of Alan W. Sinclair and Barry Wright were filed concurrently with the present application, each on Dec. 26, 2006:

"Use of a Direct Data File System With a Continuous Logical Address Space Interface" application Ser. No. 11/616,242 (publication no. 2008/0155178 A1); "System Using a Direct Data File System With a Continuous Logical Address Space Interface" application Ser. No. 11/616,236 (publication no 2008/0155228 A1); "Configuration of Host LBA Interface with Flash Memory" application Ser. No. 11/616,231 (publication no. 2008/0155177 A1); "Host System with Direct Data File Interface Configurability" application Ser. No. 11/616,228 (publication no. 2008/0155176 A1); and "Host System that Manages a LBA Interface with Flash Memory" application Ser. No. 11/616,218 (publication no. 2008/0155175 A1).

GENERAL BACKGROUND

This application relates generally to the operation of a non-volatile memory system, such as re-programmable semiconductor flash memory, to store and transfer data with a connected host device, and, more specifically, to the management of data file objects therein.

In an early generation of commercial flash memory systems, a rectangular array of memory cells was divided into a large number of groups of cells that each stored the amount of data of a standard disk drive sector, namely 512 bytes. An additional amount of data, such as 16 bytes, are also usually included in each group to store an error correction code (ECC) and possibly other overhead data relating to the user data and/or to the memory cell group in which it is stored. The memory cells in each such group are the minimum number of memory cells that are erasable together. That is, the erase unit is effectively the number of memory cells that store one data sector and any overhead data that is included. Examples of this type of memory system are described in U.S. Pat. Nos. 5,602,987 and 6,426,893. It is a characteristic of flash memory that the memory cells need to be erased prior to re-programming them with data.

Flash memory systems are most commonly provided in the form of a memory card or flash drive that is removably connected with a variety of hosts such as a personal computer, a camera or the like, but may also be embedded within such host systems. When writing data to the memory, the host typically assigns unique logical addresses to sectors, clusters or other units of data within a continuous virtual address space of the memory system. Like a disk operating system (DOS), the host writes data to, and reads data from, addresses within the logical address space of the memory system. A controller within the memory system translates logical addresses received from the host into physical addresses within the memory array, where the data are actually stored, and then keeps track of these address translations. The data storage capacity of the memory system is at least as large as the amount of data that is addressable over the entire logical address space defined for the memory system.

In later generations of flash memory systems, the size of the erase unit was increased to a block of enough memory cells to store multiple sectors of data. Even though host systems with which the memory systems are connected may program and read data in small minimum units such as sectors, a large number of sectors are stored in a single erase unit of the flash memory. It is common for some sectors of data within a block to become obsolete as the host updates or replaces logical sectors of data. Since the entire block must be erased before any data stored in the block can be overwritten, new or updated data are typically stored in another block that has been erased and has remaining capacity for the data. This process leaves the original block with obsolete data that take valuable space within the memory. But that block cannot be erased if there are any valid data remaining in it.

Therefore, in order to better utilize the memory's storage capacity, it is common to consolidate or collect valid partial block amounts of data by copying them into an erased block so that the block(s) from which these data are copied may then be erased and their entire storage capacity reused. It is also desirable to copy the data in order to group data sectors within a block in the order of their logical addresses since this increases the speed of reading the data and transferring the read data to the host. If such data copying occurs too frequently, the operating performance of the memory system can be degraded. This particularly affects operation of memory systems where the storage capacity of the memory is little more than the amount of data addressable by the host through the logical address space of the system, a typical case. In this case, data consolidation or collection may be required before a host programming command can be executed. The programming time is then increased.

The sizes of the blocks are increasing in successive generations of memory systems in order to increase the number of bits of data that may be stored in a given semiconductor area. Blocks storing 256 data sectors and more are becoming common. Additionally, two, four or more blocks of different arrays or sub-arrays are often logically linked together into metablocks in order to increase the degree of parallelism in data programming and reading. Along with such large capacity operating units come challenges in operating the memory system efficiently.

SUMMARY

The patent applications cross-referenced above describe memory systems that directly store data file objects in flash memory that are supplied by a host. This is different than most current commercial systems, where a continuous logical address space exists at the interface between the host and the memory system, as described above in the Background. With such a "LBA interface," data of individual data file objects are most commonly present in a large number of memory cell blocks. The memory system does not associate data of the file objects supplied by the host, typically in clusters of multiple data sectors each, to individual data file objects. Rather, the host merely assigns unused logical addresses within the LBA interface to data being supplied to the memory system for storage that are not currently assigned to valid data. The memory system then assigns its various memory cell blocks to store the received data in ways that make the memory system operate efficiently but without knowledge of the data file objects to which the clusters belong. A typical result can be that data of individual file objects are fragmented into pieces that are stored in many different memory cell blocks.

In many of the patent applications cross-referenced above, on the other hand, the memory system receives the data file objects directly from the host, without going through an LBA interface, so that the memory system may allocate data of individual files to its memory cell blocks in a manner that improves its performance. For example, since the file to which the data belong is known, the memory system may limit the number of memory cell blocks in which any one data file is stored. Specifically, the memory system may restrict the number of memory cell blocks in which data of a file object is stored that also contain data of another file object. The fragmentation of file data can therefore be controlled. This minimizes the volume of valid file data that must be relocated out of a common block to reclaim obsolete data space that has been created when a data of the second file stored in the block is deleted or modified. This results in significantly improved performance and endurance over the life of the flash memory system.

Such improved performance and endurance may also be realized if the direct data file management system is implemented in the host instead of the memory system. An LBA interface may still exist between the host and the memory system. But rather than allocating file data in clusters to this single contiguous logical address space, file data are allocated to blocks of logical addresses within this space that correspond to physical blocks within the memory system. The file data management techniques described in the patent applications cross-referenced above to be implemented within the flash memory system with respect to physical memory cell blocks are instead carried out within the host with respect to logical blocks of contiguous addresses within the logical address space of the host/memory system interface. The memory system may then be a conventional one, with a LBA interface, as is currently commercially popular. Operation of the direct data file management system within the host may limit the number of logical blocks that contain data from more than one file, just as the direct data file system operating in the memory system limits the number of physical memory cell blocks that contain data from more than one file. Fragmentation of data of individual file objects among physical memory cell blocks is similarly reduced but is accomplished by managing blocks of the logical address space that is mapped into physical memory cell blocks.

Logical blocks at the LBA interface are therefore preferably mapped into physical blocks of the memory system that have the same data storage capacity and other similarities. Specifically, the logical blocks are configured by the host to appear to its direct data file system to be the same as the physical blocks would appear if the direct data file system was operating within the memory system. The characteristics of the physical memory blocks, information not normally supplied to the host, may be provided by the memory system upon its initialization with the host. The host then configures the continuous logical address space into blocks with characteristics that correspond to those of the physical memory and thereafter writes data to addresses within those logical blocks.

As an alternative, the direct data file system may, instead of being implemented in a host, be operated in the memory system with logical blocks defined across the continuous address space of a LBA interface of the memory system, in the same manner as described above. Even though part of the memory system, this direct data file operation is different than the examples described in the patent applications cross-referenced above. Instead of operating at the back-end of the memory system in a manner that allows the memory system to receive data in files that replaces the LBA interface, the examples described in the prior applications, the direct data file system may be added to the memory system in advance of the LBA interface and operated in the same manner described above as if in a host in advance of its LBA interface. Such a memory system may even be configured provide both the LBA interface and the file object interface through which it may communicate with a host that has either one or the other but not both types of interfaces. This is particularly convenient for use in memory cards that are made to be removably connected with many types of host devices.

As a further alternative, a removable mother card with processing capability may be provided with the direct data file system described above in order to add the direct file capability to a host that does not have it but which has a direct data file interface. The mother card, when connected with the host, then operates to provide a LBA interface at an output of the card to which a standard memory card with a LBA interface may be removably connected.

Additional aspects, advantages and features of the present invention are included in the following description of exemplary examples thereof, which description should be taken in conjunction with the accompanying drawings.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIGS. 7A, 7B and 7C show and contrast three methods of operating a re-programmable memory system;

FIGS. 8A, 8B and 8C show and contrast in a different format the same three methods of operating a reprogrammable memory system as shown in FIGS. 7A, 7B and 7C, respectively, as well as interfaces with a host system;

FIGS. 13A-13D show four different examples of writing data of files;

FIGS. 14A-14E illustrate a sequence of writing a single data file;

FIG. 15 shows the result of reclaiming the blocks of FIG. 14E;

FIG. 19 is a table that describes the file state transitions shown in FIG. 18;

FIG. 21 is a table that describes the file state transitions shown in FIG. 20;

FIG. 22 is a state diagram that shows permitted file state transitions due to reclaiming blocks;

FIG. 23 is a table that describes the file state transitions shown in FIG. 22;

FIG. 24 shows one embodiment of an alignment of data files with logical blocks;

FIG. 25 is a table that shows the allocation of an active block under various conditions for the data alignment embodiment of FIG. 24;

FIG. 26 shows an alternative embodiment of an alignment of data files with logical blocks;

FIG. 27 is a table that shows the allocation of an active block under various conditions for the data alignment embodiment of FIG. 26;

FLASH MEMORY SYSTEM GENERAL DESCRIPTION

A typical flash memory system is described with respect to FIGS. 1-6. It is in such a system that the various aspects of the present invention may be implemented. A host system 1 of FIG. 1 stores data into and retrieves data from a flash memory 2. Although the flash memory can be embedded within the host, the memory 2 is illustrated to be in the more popular form of a card that is removably connected to the host through mating parts 3 and 4 of a mechanical and electrical connector. There are currently many different flash memory cards that are commercially available, examples being the CompactFlash (CF), the MultiMediaCard (MMC), Secure Digital (SD), miniSD, Memory Stick, SmartMedia and TransFlash cards. Although each of these cards has a unique mechanical and/or electrical interface according to its standardized specifications, the flash memory included in each is very similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that use such memory cards and flash drives are many and varied. They include personal computers (PCs), laptop and other portable computers, cellular telephones, personal digital assistants (PDAs), digital still cameras, digital movie cameras and portable audio players. The host typically includes a built-in receptacle for one or more types of memory cards or flash drives but some require adapters into which a memory card is plugged.

Figure 1:
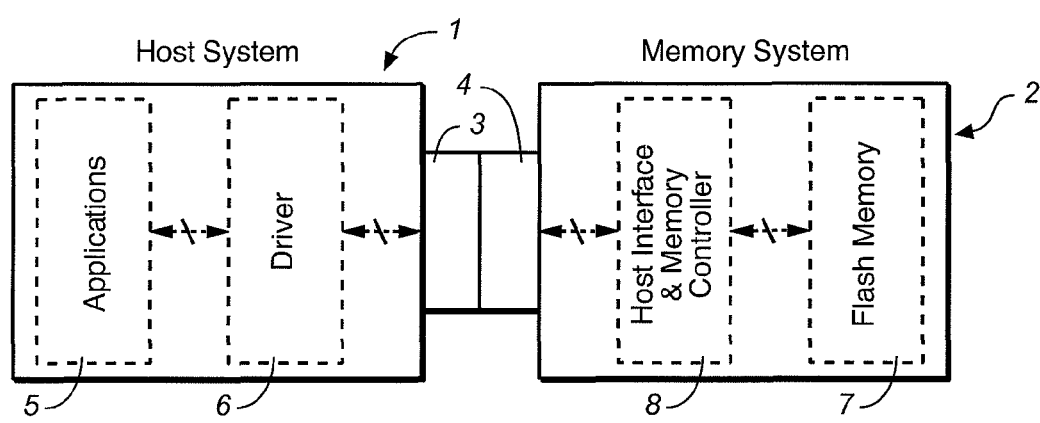
FIG. 1 schematically illustrates a host and a connected non-volatile memory system.

The host system 1 of FIG. 1 may be viewed as having two major parts, insofar as the memory 2 is concerned, made up of a combination of circuitry and software. They are an applications portion 5 and a driver portion 6 that interfaces with the memory 2. In a personal computer, for example, the applications portion 5 can include a processor running word processing, graphics, control or other popular application software. In a camera, cellular telephone or other host system that is primarily dedicated to performing a single set of functions, the applications portion 5 includes the software that operates the camera to take and store pictures, the cellular telephone to make and receive calls, and the like.

The memory system 2 of FIG. 1 includes flash memory 7, and circuits 8 that both interface with the host to which the card is connected for passing data back and forth and control the memory 7. The controller 8 typically converts between logical addresses of data used by the host 1 and physical addresses of the memory 7 during data programming and reading.

Figure 2:
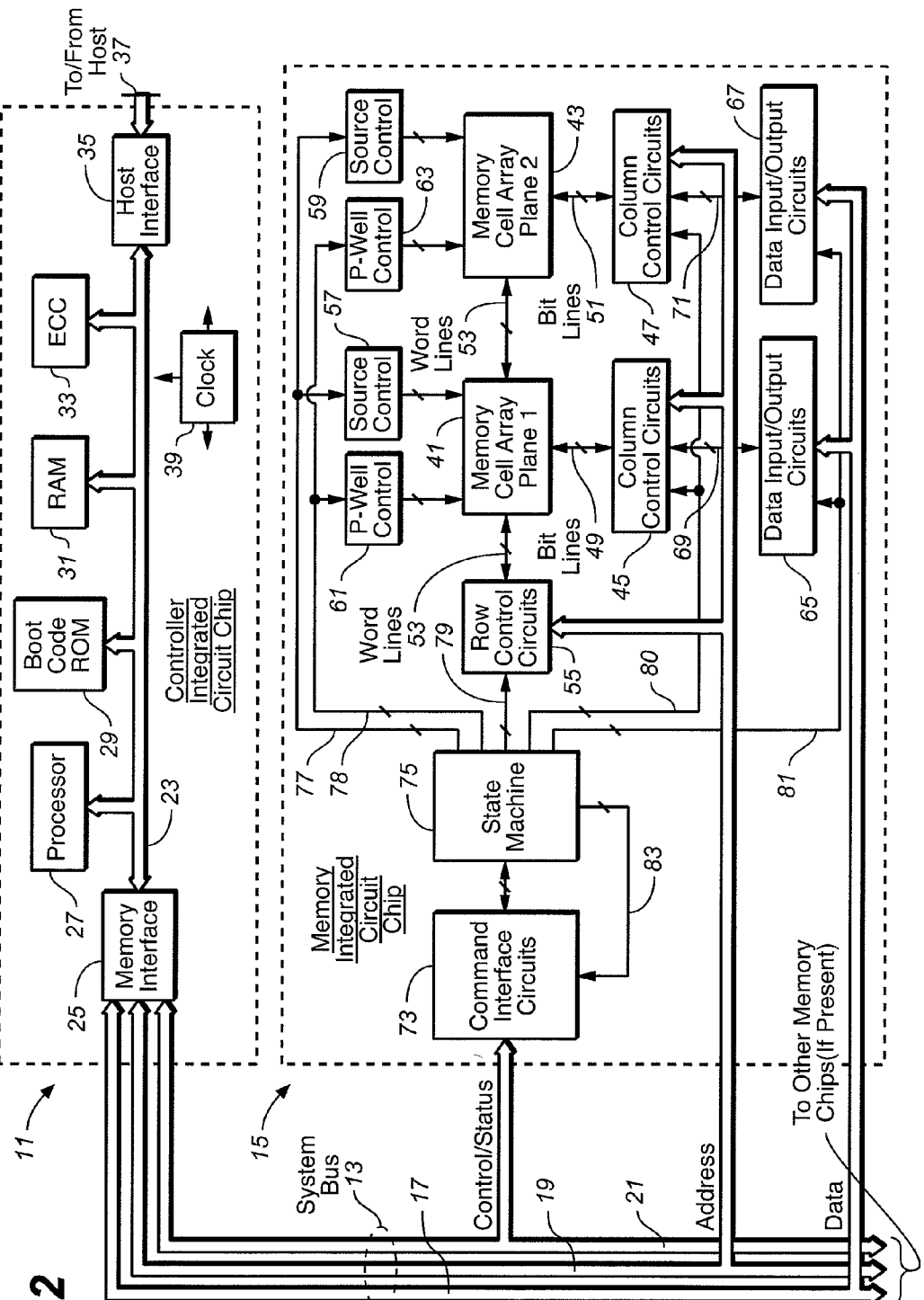
FIG. 2 is a block diagram of an example flash memory system for use as the non-volatile memory of FIG. 1.

Referring to FIG. 2, circuitry of a typical flash memory system that may be used as the non-volatile memory 2 of FIG. 1 is described. The system controller is usually implemented on a single integrated circuit chip 11 that is connected in parallel with one or more integrated circuit memory chips over a system bus 13, a single such memory chip 15 being shown in FIG. 2. The particular bus 13 that is illustrated includes a separate set of conductors 17 to carry data, a set 19 for memory addresses and a set 21 for control and status signals. Alternatively, a single set of conductors may be time shared between these three functions. Further, other configurations of system buses can be employed, such as a ring bus that is described in U.S. patent application Ser. No. 10/915,039, filed Aug. 9, 2004, entitled "Ring Bus Structure and It's Use in Flash Memory Systems," publication no. 2006/0031593 A1.

A typical controller chip 11 has its own internal bus 23 that interfaces with the system bus 13 through interface circuits 25. The primary functions normally connected to the bus are a processor 27 (such as a microprocessor or micro-controller), a read-only-memory (ROM) 29 containing code to initialize ("boot") the system and a random-access-memory (RAM) 31 used primarily to buffer data being transferred between the memory and a host Circuits 33 that calculate and check an error correction code (ECC) for data passing through the controller between the memory and the host may also be connected to the bus 23. A circuit 34 dedicated to encoding and decoding data passing through the controller may also be included. Such encoding includes compression and security encryption but most any type of data transformation may be performed in this manner. The dedicated circuits 33 and 34, when utilized, execute specific algorithms that could otherwise be executed by the processor 27 under firmware control. The controller bus 23 interfaces with a host system through circuits 35, which, in the case of the system of FIG. 2 being contained within a memory card, is done through external contacts 37 of the card that are part of the connector 4. A clock 39 is connected with and utilized by each of the other components of the controller 11.

The memory chip 15, as well as any other connected with the system bus 13, typically contains an array of memory cells organized into multiple sub-arrays or planes, two such planes 41 and 43 being illustrated for simplicity but more, such as four or eight such planes, may instead be used. Alternatively, the memory cell array of the chip 15 may not be divided into planes. When so divided however, each plane has its own column control circuits 45 and 47 that are operable independently of each other. The circuits 45 and 47 receive addresses of their respective memory cell array from the address portion 19 of the system bus 13, and decode them to address a specific one or more of respective bit lines 49 and 51. The word lines 53 are addressed through row control circuits 55 in response to addresses received on the address bus 19. Source voltage control circuits 57 and 59 are also connected with the respective planes, as are p-well voltage control circuits 61 and 63. If the memory chip 15 has a single array of memory cells, and if two or more such chips exist in the system, the array of each chip may be operated similarly to a plane or sub-array within the multi-plane chip described above.

Data are transferred into and out of the planes 41 and 43 through respective data input/output circuits 65 and 67 that are connected with the data portion 17 of the system bus 13. The circuits 65 and 67 provide for both programming data into the memory cells and for reading data from the memory cells of their respective planes, through lines 69 and 71 connected to the planes through respective column control circuits 45 and 47.

Although the controller 11 controls the operation of the memory chip 15 to program data, read data, erase and attend to various housekeeping matters, each memory chip also contains some controlling circuitry that executes commands from the controller 11 to perform such functions. Interface circuits 73 are connected to the control and status portion 21 of the system bus 13. Commands from the controller are provided to a state machine 75 that then provides specific control of other circuits in order to execute these commands. Control lines 77-81 connect the state machine 75 with these other circuits as shown in FIG. 2. Status information from the state machine 75 is communicated over lines 83 to the interface 73 for transmission to the controller 11 over the bus portion 21.

A NAND architecture of the memory cell arrays 41 and 43 is currently preferred, although other architectures, such as NOR, can also be used instead. Examples of NAND flash memories and their operation as part of a memory system may be had by reference to U.S. Pat. Nos. 5,570,315, 5,774,397, 6,046,935, 6,373,746, 6,456,528, 6,522,580, 6,771,536 and 6,781,877 and United States patent application publication no. 2003/0147278.

Figure 3:
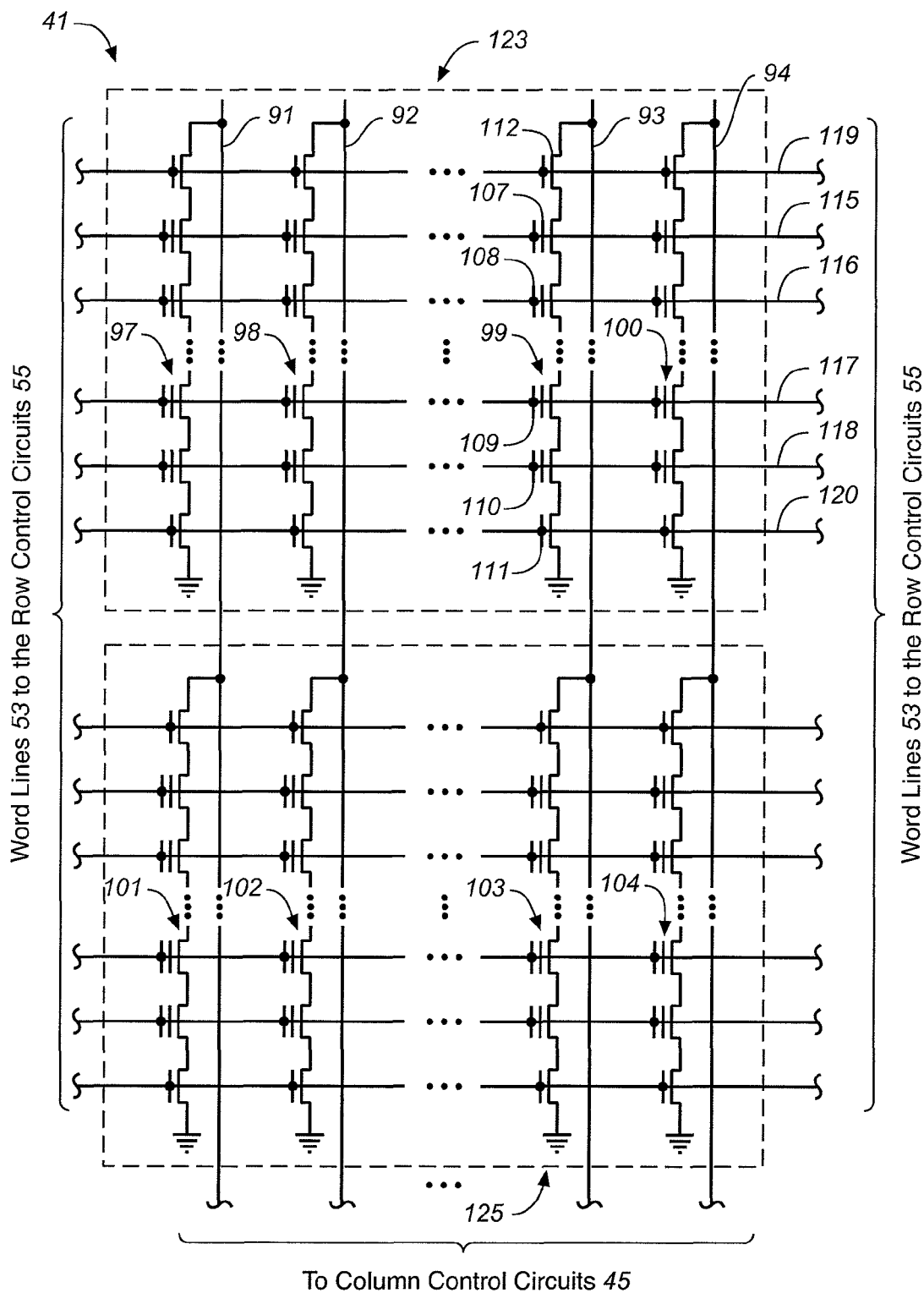
FIG. 3 is a representative circuit diagram of a memory cell array that may be used in the system of FIG. 2.

An example NAND array is illustrated by the circuit diagram of FIG. 3, which is a portion of the memory cell array 41 of the memory system of FIG. 2. A large number of global bit lines are provided, only four such lines 91-94 being shown in FIG. 2 for simplicity of explanation. A number of series connected memory cell strings 97-104 are connected between one of these bit lines and a reference potential. Using the memory cell string 99 as representative, a plurality of charge storage memory cells 107-110 are connected in series with select transistors 111 and 112 at either end of the string. When the select transistors of a string are rendered conductive, the string is connected between its bit line and the reference potential. One memory cell within that string is then programmed or read at a time.

Word lines 115-118 of FIG. 3 individually extend across the charge storage element of one memory cell in each of a number of strings of memory cells, and gates 119 and 120 control the states of the select transistors at each end of the strings. The memory cell strings that share common word and control gate lines 115-120 are made to form a block 123 of memory cells that are erased together. This block of cells contains the minimum number of cells that are physically erasable at one time. One row of memory cells, those along one of the word lines 115-118, are programmed at a time. Typically, the rows of a NAND array are programmed in a prescribed order, in this case beginning with the row along the word line 118 closest to the end of the strings connected to ground or another common potential. The row of memory cells along the word line 117 is programmed next, and so on, throughout the block 123. The row along the word line 115 is programmed last.

A second block 125 is similar, its strings of memory cells being connected to the same global bit lines as the strings in the first block 123 but having a different set of word and control gate lines. The word and control gate lines are driven to their proper operating voltages by the row control circuits 55. If there is more than one plane or sub-array in the system, such as planes 1 and 2 of FIG. 2, one memory architecture uses common word lines extending between them. There can alternatively be more than two planes or sub-arrays that share common word lines. In other memory architectures, the word lines of individual planes or sub-arrays are separately driven.

As described in several of the NAND patents and published application referenced above, the memory system may be operated to store more than two detectable levels of charge in each charge storage element or region, thereby to store more than one bit of data in each. The charge storage elements of the memory cells are most commonly conductive floating gates but may alternatively be non-conductive dielectric charge trapping material, as described in U.S. Pat. No. 6,925,007.

Figure 4:
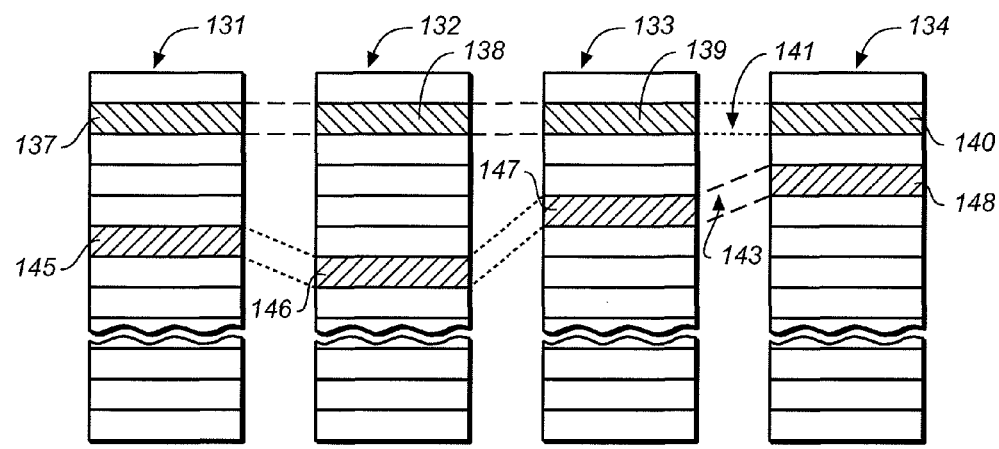
FIG. 4 illustrates an example physical memory organization of the system of FIG. 2.

FIG. 4 conceptually illustrates an organization of the flash memory cell array 7 (FIG. 1) that is used as an example in further descriptions below. Four planes or sub-arrays 131-134 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 4 by rectangles, such as blocks 137, 138, 139 and 140, located in respective planes 131-134. There can be dozens or hundreds of blocks in each plane. As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 137-140 are shown to form one metablock 141. All of the cells within a metablock are typically erased together. The blocks used to form a metablock need not be restricted to the same relative locations within their respective planes, as is shown in a second metablock 143 made up of blocks 145-148. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 5:
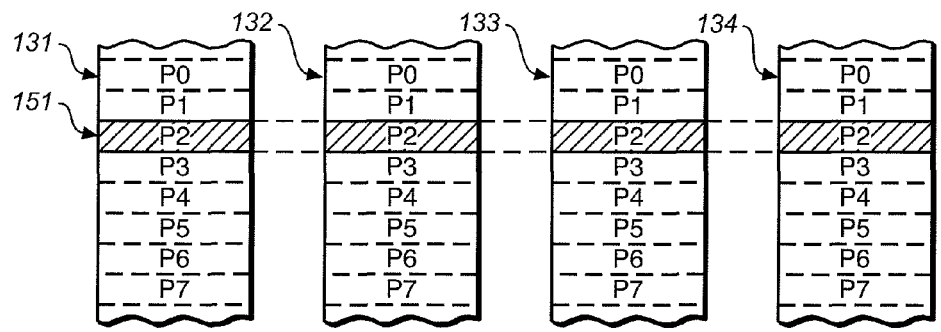
FIG. 5 shows an expanded view of a portion of the physical memory of FIG. 4.

The individual blocks are in turn divided for operational purposes into pages of memory cells, as illustrated in FIG. 5. The memory cells of each of the blocks 131-134, for example, are each divided into eight pages P0-P7. Alternatively, there may be 16, 32 or more pages of memory cells within each block. The page is the unit of data programming and reading within a block, containing the minimum amount of data that are programmed at one time. In the NAND architecture of FIG. 3, a page is formed of memory cells along a word line within a block. However, in order to increase the memory system operational parallelism, such pages within two or more blocks may be logically linked into metapages. A metapage 151 is illustrated in FIG. 5, being formed of one physical page from each of the four blocks 131-134. The metapage 151, for example, includes the page P2 in of each of the four blocks but the pages of a metapage need not necessarily have the same relative position within each of the blocks. Although it is preferable to program and read the maximum amount of data in parallel across all four planes, for high system performance, the memory system can also be operated to form metapages of any or all of one, two or three pages in separate blocks in different planes. This allows the programming and reading operations to adaptively match the amount of data that may be conveniently handled in parallel and reduces the occasions when part of a metapage remains unprogrammed with data.

A metapage formed of physical pages of multiple planes, as illustrated in FIG. 5, contains memory cells along word line rows of those multiple planes. Rather than programming all of the cells in one word line row at the same time, they are more commonly alternately programmed in two or more interleaved groups, each group storing a page of data (in a single block) or a metapage of data (across multiple blocks). By programming alternate memory cells at one time, a unit of peripheral circuits including data registers and a sense amplifier need not be provided for each bit line but rather are time-shared between adjacent bit lines. This economizes on the amount of substrate space required for the peripheral circuits and allows the memory cells to be packed with an increased density along the rows. Otherwise, it is preferable to simultaneously program every cell along a row in order to maximize the parallelism available from a given memory system.

With reference to FIG. 3, the simultaneous programming of data into every other memory cell along a row is most conveniently accomplished by providing two rows of select transistors (not shown) along at least one end of the NAND strings, instead of the single row that is shown. The select transistors of one row then connect every other string within a block to their respective bit lines in response to one control signal, and the select transistors of the other row connect intervening every other string to their respective bit lines in response to another control signal. Two pages of data are therefore written into each row of memory cells.

Figure 6:
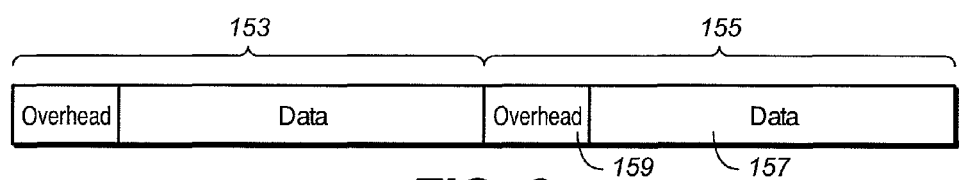
FIG. 6 shows a further expanded view of a portion of the physical memory of FIGS. 4 and 5.

The amount of data in each logical page is typically an integer number of one or more sectors of data, each sector containing 512 bytes of data, by convention. FIG. 6 shows a logical data page of two sectors 153 and 155 of data of a page or metapage. Each sector usually contains a portion 157 of 512 bytes of user or system data being stored and another number of bytes 159 for overhead data related either to the data in the portion 157 or to the physical page or block in which it is stored. The number of bytes of overhead data is typically 16 bytes, making the total 528 bytes for each of the sectors 153 and 155. The overhead portion 159 may contain an ECC calculated from the data portion 157 during programming, its logical address, an experience count of the number of times the block has been erased and re-programmed, one or more control flags, operating voltage levels, and/or the like, plus an ECC calculated from such overhead data 159. Alternatively, the overhead data 159, or a portion of it, may be stored in different pages in other blocks.

As the parallelism of memories increases, data storage capacity of the metablock increases and the size of the data page and metapage also increase as a result. The data page may then contain more than two sectors of data. With two sectors in a data page, and two data pages per metapage, there are four sectors in a metapage. Each metapage thus stores 2048 bytes of data. This is a high degree of parallelism, and can be increased even further as the number of memory cells in the rows are increased. For this reason, the width of flash memories is being extended in order to increase the amount of data in a page and a metapage.

The physically small re-programmable non-volatile memory cards and flash drives identified above are commercially available with data storage capacity of 512 megabytes (MB), 1 gigabyte (GB), 2 GB and 4 GB, and may go higher.

Techniques for Handling File Objects

Operation with a Logical Block (LBA) Memory/Host Interface

Figure 8C:
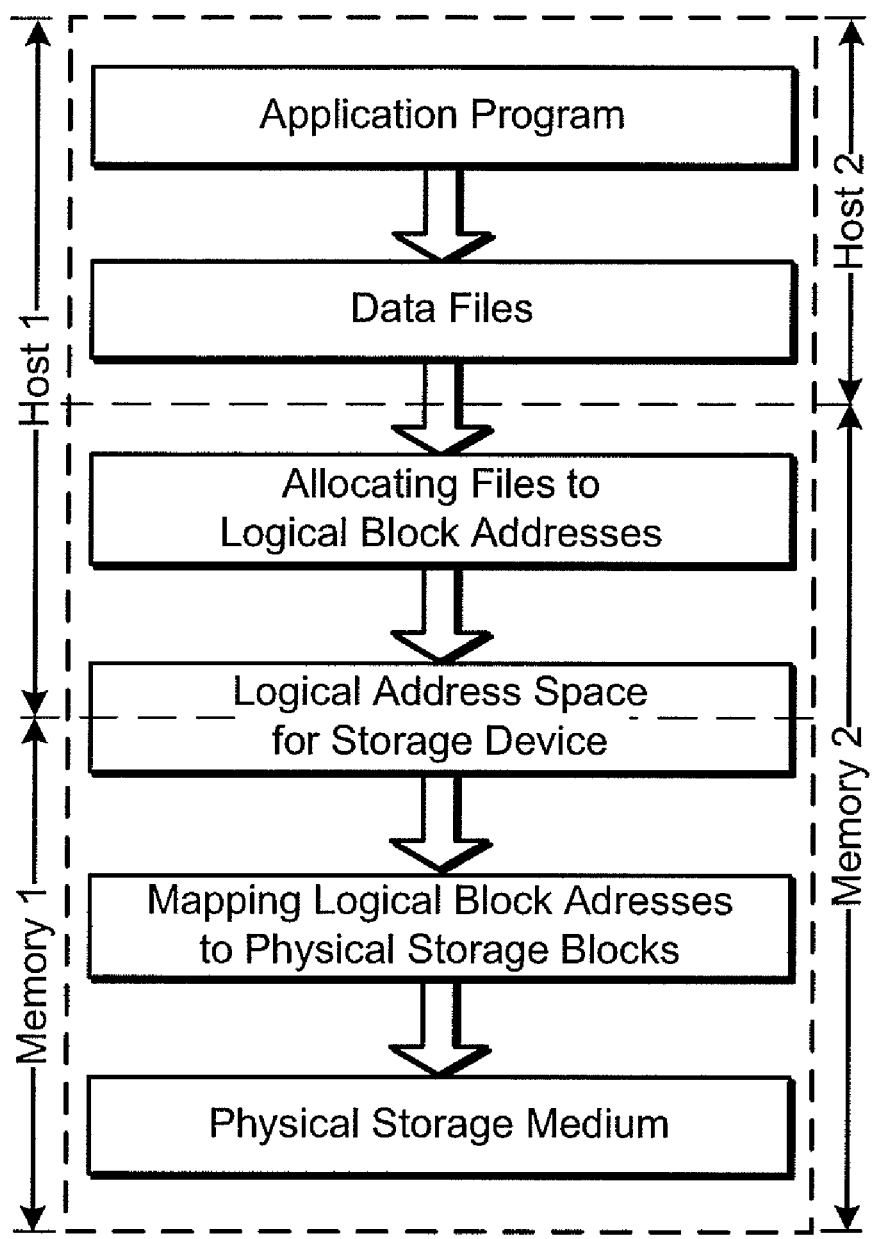
Figure 9A:
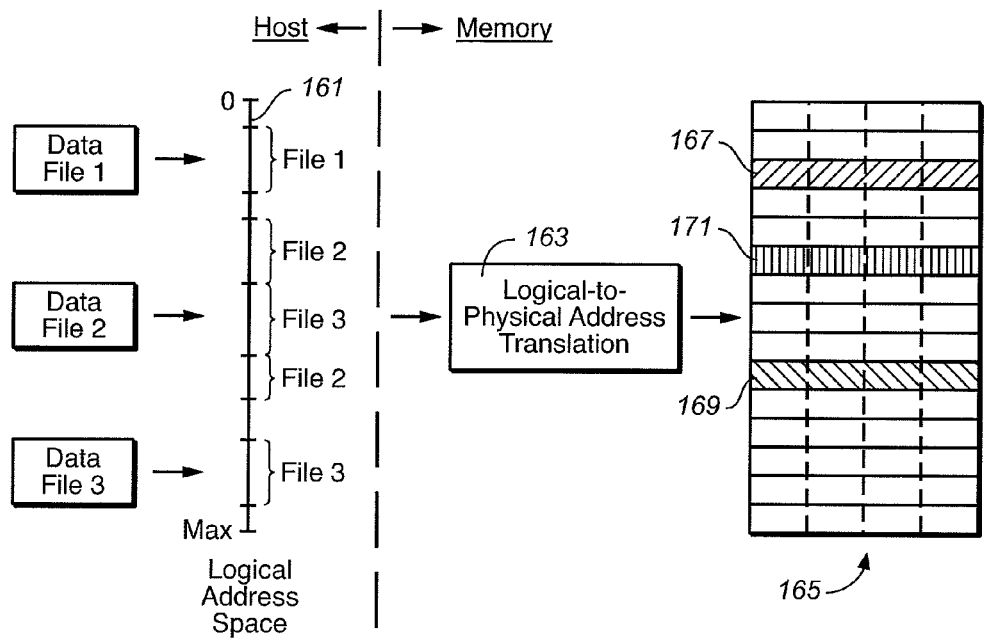
FIGS. 9A, 9B and 9C show and contrast in a different format the same three methods of operating a reprogrammable memory system and interfaces with a host, as shown in FIGS. 8A, 8B and 8C, respectively.

A common logical interface between the host and the memory system is illustrated in different forms in each of FIGS. 7A, 8A and 9A. The host generated data files are allocated logical addresses in a continuous system address space (LBA Interface) by the host, typically in a unit of a cluster of multi-sectors of data. The memory system then sees these logical addresses and maps them into physical addresses of blocks of memory cells where the data are actually stored.

Referring specifically to FIG. 9A, a continuous logical address space 161 is large enough to provide addresses for all the data that may be stored in the memory system. The host address space is typically divided into increments of clusters of data. Each cluster may be designed in a given host system to contain a number of sectors of data, somewhere between 4 and 64 sectors being typical. A standard sector contains 512 bytes of user data plus optionally a number of bytes of overhead data, typically 16 bytes, for a total of 528 bytes.

FIG. 9A illustrates the most common interface between a host and a mass memory system such as found on memory cards or flash drives. The host deals with data files generated or used by application software or firmware programs executed by the host. By "file" or "file object" is meant a group of data recognized by the host as a defined entity for some application or purpose. The data of a file object are managed as a unit. Data of a word processing file is an example, and data of a drawing file of computer aided design (CAD) software is another, found mainly in general computer hosts such as PCs, laptop computers and the like. Data of a document in the pdf format is also such a file. Data of a file object may be generated by the host during execution of an application program or generated elsewhere and then provided to the host. A still digital video camera generates a data file for each picture that is stored on a memory card. A cellular telephone utilizes data from files on an internal memory card, such as a telephone directory. A PDA stores and uses data of several different files, such as an address file, a calendar file, and the like. In any such application, the memory card may also contain software that operates the host.

Three Files 1, 2 and 3 are shown in the example of FIG. 9A to have been created. An application program running on the host system creates each file as an ordered set of data and identifies it by a unique name or other reference. Enough available logical address space not already allocated to other files is assigned by the host to File 1. File 1 is shown to have been assigned a contiguous range of available logical addresses. Ranges of addresses are also commonly allocated for specific purposes, such as a particular range for the host operating software, which are then avoided for storing data even if these addresses have not been utilized at the time the host is assigning logical addresses to the data.

When a File 2 is later created by the host, the host similarly assigns two different ranges of contiguous addresses within the logical address space 161, as shown in FIG. 7. A file need not be assigned contiguous logical addresses but rather can be fragments of addresses in between address ranges already allocated to other files. This example then shows that yet another File 3 created by the host is allocated other portions of the host address space not previously allocated to the Files 1 and 2 or other data.

The host keeps track of the memory logical address space by maintaining a file allocation table (FAT), where the logical addresses the host assigns to the various host files are maintained. The FAT table is typically stored in the non-volatile memory, as well as in a host memory, and is frequently updated by the host as new files are stored, other files deleted, files modified and the like. When a host file is deleted, for example, the host then deallocates the logical addresses previously allocated to the deleted file by updating the FAT table to show that they are now available for use with other data files.

The host is not concerned about the physical locations where the memory system controller chooses to store the files. The typical host only knows its logical address space and the logical addresses that it has allocated to its various files. The memory system, on the other hand, through a typical LBA host/card interface, only knows the portions of the logical address space to which data have been written but does not know the logical addresses allocated to specific host files, or even the number of host files. The memory system controller converts the logical addresses provided by the host for the storage or retrieval of data into unique physical addresses within the flash memory cell array where host data are stored. A block 163 represents a working table of these logical-to-physical address conversions, which is maintained by the memory system controller.

The memory system controller is programmed to store data files within the blocks and metablocks of a memory array 165 in a manner to maintain the performance of the system at a high level. Four planes or sub-arrays are used in this illustration. Data are preferably programmed and read with the maximum degree of parallelism that the system allows, across an entire metablock formed of a block from each of the planes. At least one metablock 167 is usually allocated as a reserved block for storing operating firmware and data used by the memory controller. Another metablock 169, or multiple metablocks, may be allocated for storage of host operating software, the host FAT table and the like. Most of the physical storage space remains for the storage of data files. The memory controller does not know, however, how the data received has been allocated by the host among its various file objects. All the memory controller typically knows from interacting with the host is that data written by the host to specific logical addresses are stored in corresponding physical addresses as maintained by the controller's logical-to-physical address table 163.

In a typical memory system, a few extra blocks of storage capacity are provided than are necessary to store the amount of data within the address space 161. One or more of these extra blocks may be provided as redundant blocks for substitution for other blocks that may become defective during the lifetime of the memory. The logical grouping of blocks contained within individual metablocks may usually be changed for various reasons, including the substitution of a redundant block for a defective block originally assigned to the metablock. One or more additional blocks, such as metablock 171, are typically maintained in an erased block pool. When the host writes data to the memory system, the controller converts the logical addresses assigned by the host to physical addresses within a metablock in the erased block pool. Other metablocks not being used to store data within the logical address space 161 are then erased and designated as erased pool blocks for use during a subsequent data write operation.

Data stored at specific host logical addresses are frequently overwritten by new data as the original stored data become obsolete. The memory system controller, in response, writes the new data in an erased block and then changes the logical-to-physical address table for those logical addresses to identify the new physical block to which the data at those logical addresses are stored. The blocks containing the original data at those logical addresses are then erased and made available for the storage of new data. Such erasure often must take place before a current data write operation may be completed if there is not enough storage capacity in the pre-erased blocks from the erase block pool at the start of writing. This can adversely impact the system data programming speed. The memory controller typically learns that data at a given logical address has been rendered obsolete by the host only when the host writes new data to their same logical address. Many blocks of the memory can therefore be storing such invalid data for a time.

The sizes of blocks and metablocks utilized in commercial memory systems are increasing in order to efficiently use the area of the integrated circuit memory chip. This results in a large proportion of individual data writes storing an amount of data that is less than the storage capacity of a metablock, and in many cases even less than that of a block. Since the memory system controller normally directs new data to an erased pool metablock, this can result in portions of metablocks going unfilled. If the new data are updates of some data stored in another metablock, remaining valid metapages of data from that other metablock having logical addresses contiguous with those of the new data metapages are also desirably copied in logical address order into the new metablock. The old metablock may retain other valid data metapages. This results over time in data of certain metapages of an individual metablock being rendered obsolete and invalid, and replaced by new data with the same logical address being written to a different metablock.

In order to maintain enough physical memory space to store data over the entire logical address space 161, such data are periodically compacted or consolidated (garbage collected) in order to reclaim a block that is added to a pool of erased blocks. It is also desirable to maintain sectors of data within the metablocks in the same order as their logical addresses as much as practical, since this makes reading data in contiguous logical addresses more efficient. So data compaction and garbage collection are typically performed with this additional goal. Some aspects of managing a memory when receiving partial block data updates and the use of metablocks are described in U.S. Pat. No. 6,763,424.

Data compaction typically involves reading all valid data metapages from a metablock and writing them to a new block, ignoring metapages with invalid data in the process. The metapages with valid data are also preferably arranged with a physical address order that matches the logical address order of the data stored in them. The number of metapages occupied in the new metablock will be less than those occupied in the old metablock since the metapages containing invalid data are not copied to the new metablock. The old block is then erased and added to the erased block pool in order to be made available to store new data. The additional metapages of capacity gained by the consolidation can then be used to store other data.

During garbage collection, metapages of valid data with contiguous or near contiguous logical addresses are gathered from two or more metablocks and re-written into another metablock, usually one in the erased block pool. When all valid data metapages are copied from the original two or more metablocks, they may be erased for future use. The occurrences of data consolidation and garbage collection increases as the fragmentation of the files being stored among different blocks increases.

Data consolidation and garbage collection take time and can affect the performance of the memory system, particularly if data consolidation or garbage collection needs to take place before a command from the host can be executed. Such operations are normally scheduled by the memory system controller to take place in the background as much as possible but the need to perform these operations can cause the controller to have to give the host a busy status signal until such an operation is completed. An example of where execution of a host command can be delayed is where there are not enough pre-erased metablocks in the erased block pool to store all the data that the host wants to write into the memory and data consolidation or garbage collection is needed first to clear one or more metablocks of valid data, which can then be erased. Attention has therefore been directed to managing control of the memory in order to minimize such disruptions. Many such techniques are described in the following U.S. patent applications: Ser. No. 10/749,831, filed Dec. 30, 2003, entitled "Management of Non-Volatile Memory Systems Having Large Erase Blocks," now publication no. 2005/0144358 A1; Ser. No. 10/750,155, filed Dec. 30, 2003, entitled "Non-Volatile Memory and Method with Block Management System," now U.S. Pat. No. 7,139,864; Ser. No. 10/917,888, filed Aug. 13, 2004, entitled "Non-Volatile Memory and Method with Memory Planes Alignment," now publication no. 2005/0141313 A1; Ser. No. 10/917,867, filed Aug. 13, 2004, entitled "Non-volatile Memory and Method with Non-Sequential Update Block Management," now publication no. 2005/0141312 A1; Ser. No. 10/917,889, filed Aug. 13, 2004, entitled "Non-Volatile Memory and Method with Phased Program Failure Handling," now publication no. 2005/0166087 A1; Ser. No. 10/917,725, filed Aug. 13, 2004, entitled "Non-Volatile Memory and Method with Control Data Management," now publication no. 2005/0144365 A1;" Ser. No. 11/016,285, filed Dec. 16, 2004, entitled "Scratch Pad Block," now publication no. 2006/0161722 A1; Ser. No. 11/192,220, filed Jul. 27, 2005, entitled "Non-Volatile Memory and Method with Multi-Stream Update Tracking," now publication no. 2006/0155921 A1; Ser. No. 11/192,386, filed Jul. 27, 2005, entitled "Non-Volatile Memory and Method with Improved Indexing for Scratch Pad and Update Blocks," now publication no. 2006/0155922 A1; and Ser. No. 11/191,686, filed Jul. 27, 2005, entitled "Non-Volatile Memory and Method with Multi-Stream Updating," now publication no. 2006/0155920 A1.

One challenge to efficiently control operation of memory arrays with very large erase blocks is to match and align the number of data sectors being stored during a given write operation with the capacity and boundaries of blocks of memory. One approach is to configure a metablock used to store new data from the host with less than a maximum number of blocks, as necessary to store a quantity of data less than an amount that fills an entire metablock. The use of adaptive metablocks is described in U.S. patent application Ser. No. 10/749,189, filed Dec. 30, 2003, entitled "Adaptive Metablocks," now publication no. 2005/0144357 A1. The fitting of boundaries between blocks of data and physical boundaries between metablocks is described in patent application Ser. No. 10/841,118, filed May 7, 2004, entitled "Data Boundary Management, now publication nos. 2005/0144363 A1, and Ser. No. 11/016,271, filed Dec. 16, 2004, entitled "Data Run Programming," now publication no. 2005/0144367 A1.

The memory controller may also use data from the FAT table, which is stored by the host in the non-volatile memory, to more efficiently operate the memory system. One such use is to learn when data has been identified by the host to be obsolete by deallocating their logical addresses. Knowing this allows the memory controller to schedule erasure of the blocks containing such invalid data before it would normally learn of it by the host writing new data to those logical addresses. This is described in U.S. patent application Ser. No. 10/897,049, filed Jul. 21, 2004, entitled "Method and Apparatus for Maintaining Data in Non-Volatile Memory Systems." Other techniques include monitoring host patterns of writing new data to the memory in order to deduce whether a given write operation is a single file, or, if multiple files, where the boundaries between the files lie. U.S. patent application Ser. No. 11/022,369, filed Dec. 23, 2004, entitled "FAT Analysis for Optimized Sequential Cluster Management," describes the use of techniques of this type.

To operate the memory system efficiently, it is desirable for the controller to know as much about the logical addresses assigned by the host to data of its individual files as it can. Data files can then be stored by the controller within a single metablock or group of metablocks, rather than being scattered among a larger number of metablocks when file boundaries are not known. The result is that the number and complexity of data consolidation and garbage collection operations are reduced. The performance of the memory system improves as a result. But it is difficult for the memory controller to know much about the host data file structure when the host/memory interface includes the logical address space 161 (FIG. 9A), as described above.

Direct Data File Operation

Figure 9B:
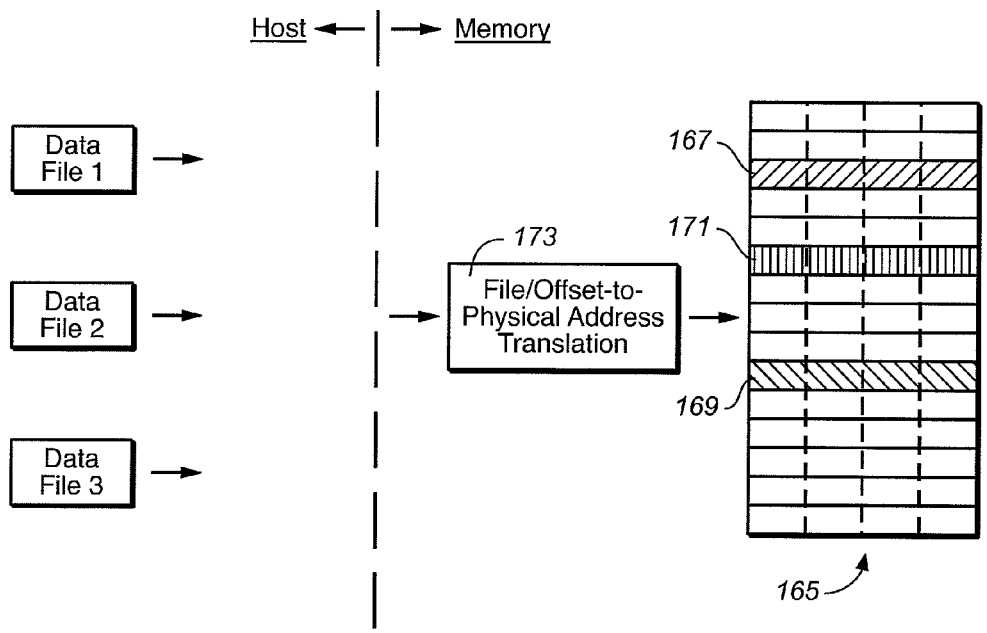

The different type of interface shown in FIGS. 7B, 8B and 9B between a host and memory system for the storage of mass amounts of data eliminates use of the logical address space. The host instead logically addresses data of each file by a unique fileID (or other unique reference) and offset addresses of units of data (such as bytes) within the file. These addresses are given directly to the memory system controller, which then keeps its own table of where the data of each host file are physically stored. This is the operation that is the principal subject of the patent applications cross-referenced above. This file interface can be implemented with the same memory system as described above with respect to FIGS. 2-6. The primary difference between the file-based interface of FIGS. 7B, 8B and 9B and the LBA interface of FIGS. 7A, 8A and 9A is the manner in which the memory system communicates with a host system and stores the file data.

Comparing the file based interface of FIG. 8B with the LBA interface of FIG. 8A, the logical address space and host maintained FAT table of FIG. 8A are not present in FIG. 8B. Rather, data files generated by the host are identified to the memory system by file number and offsets of data within the file. The memory system then directly maps the files to the physical blocks of the memory cell array.

When a new data file is programmed into the memory with the direct data file storage techniques, the data are written into an erased block of memory cells beginning with the first physical location in the block and proceeding through the locations of the block sequentially in order. The data are programmed in the order received from the host, regardless of the order of the offsets of that data within the file. Programming continues until all data of the file have been written into the memory. If the amount of data in the file exceeds the capacity of a single memory block, then, when the first block is full, programming continues in a second erased block. The second memory block is programmed in the same manner as the first, in order from the first location until either all the data of the file are stored or the second block is full. A third or additional blocks may be programmed with any remaining data of the file. Multiple blocks or metablocks storing data of a single file need not be physically or logically contiguous. For ease of explanation, unless otherwise specified, it is intended that the term "block" as used herein refer to either the block unit of erase or a multiple block "metablock," depending upon whether metablocks are being used in a specific system.

With reference to FIG. 9B, an identification of each of the Files 1, 2 and 3 and offsets of data within the files are passed directly to the memory controller. This logical address information is then translated by a memory controller function 173 into physical addresses of metablocks and metapages of the memory 165. The file data are not mapped into the logical address space 161 of FIG. 9A.

Principles of a Flash Optimized File System

Figure 9C:
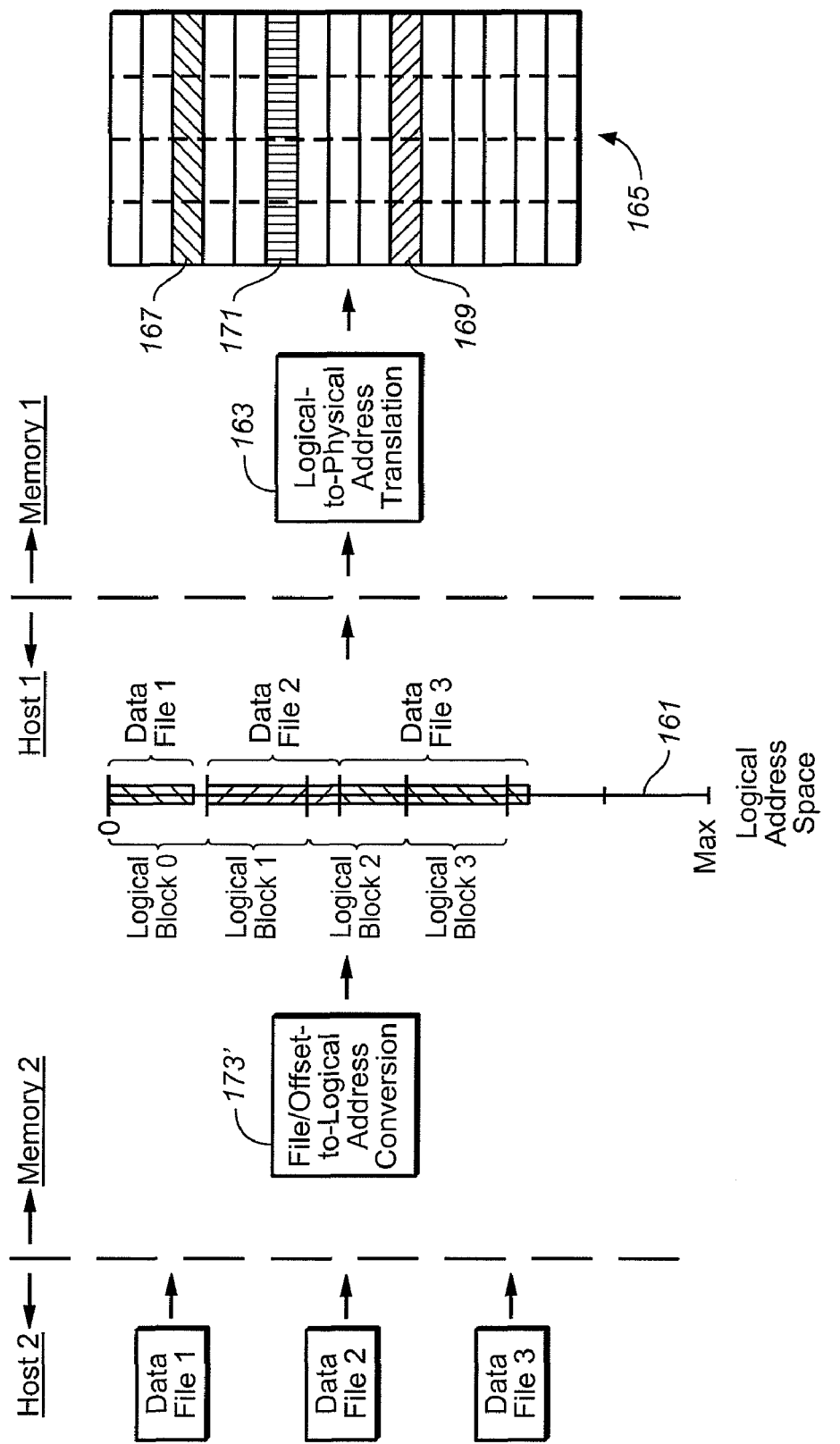

FIGS. 7C, 8C and 9C illustrate, in different forms, an operating system that incorporates the direct data file technique of FIGS. 7B, 8B and 9B with a LBA interface of the type included in FIGS. 7A, 8A and 9A. The "Flash-Optimized File System" of FIG. 7C operates in essentially the same manner as the "Direct File Storage Back End System" of FIG. 7B, except that data of the files are mapped to logical blocks within the continuous address space of the LBA Interface in FIG. 7C instead of being mapped to physical memory cell blocks of the NAND flash in FIG. 7B. The LBA Interface and "LBA-to-Physical Back End System" of FIG. 7C are common with the system of FIG. 7A. In the system of FIG. 7C, the direct file-to-block address allocation occurs before the LBA interface but works with logical block addresses in the continuous address space of the LBA interface instead of physical blocks of the NAND flash memory.

The same idea is illustrated in a different form in FIG. 8C. Data files generated by a host are allocated to logical block addresses in a logical address space of the storage device. The logical blocks of the logical address space are then mapped to blocks of the physical storage medium by the memory controller in a conventional manner. Two possible divisions of these functions as between the host and the memory system are illustrated in FIG. 8C. The primary embodiment allocates files to logical block addresses in the host, identified as Host 1 in the figure. The Memory 1 is then a conventional memory card or other device that has a LBA interface that connects with the LBA interface of the host. Alternatively, Host 2 of FIG. 8C interfaces data file identifications and data offsets within the files with the memory system. The direct data file function of allocating these files to logical block addresses is then performed within Memory 2.

The Memory 2 of FIG. 8C, most commonly in the form of a memory card, flash drive or other small, portable unit, may additionally include a LBA interface by providing an external connection with the Logical Address Space for the Storage Device. As a further alternative, the function of Allocating Files to Logical Block Addresses may be executed in a mother card that includes a microprocessor. The mother card is then made to be removably connectable with a Host 2, and a Memory 1 would be removably connectable with the mother card.

The technique of mapping data of file objects to a logical address space is illustrated in a different manner in FIG. 9C. A function 173' receives data of individual files with individual logical addresses of a unique file identifier and offset addresses of data within the file. These file addresses are converted by the function 173' to addresses within logical blocks of the continuous logical address space 161. The address range of the individual logical blocks is defined to have the same data storage capacity of a block or metablock of the memory array 165, depending upon which unit is being utilized by the physical memory. The function 173' of FIG. 9C is essentially the same as the function 173 of FIG. 9B except that the files are mapped in FIG. 9C to logical blocks within the address space 161, while the files in FIG. 9B are mapped directly to the memory cell array 165. The logical address blocks are then translated in FIG. 9C by a function 163 to the memory array 165, essentially the same as in FIG. 9A. The function 163 may be a conventional flash memory operating system, such as described in aforemention U.S. Pat. No. 7,139,864, and the following published patent applications previously listed: 2005/0141313 A1, 2005/0141312 A1, 2005/0166087 A1, 2005/0144365 A1 and 2006/0161722 A1.

It will be noted from FIG. 9C that individual logical blocks of the address space 161 can contain addresses of data from more than one file. Also, data of the individual files may be assigned addresses within more than one logical block. Each of the Data Files 2 and 3, for example, are assigned addresses within two or more logical blocks. A logical block may also contain data of two different files; logical block 2 of FIG. 9C is an example of this. But at least one limit is preferably placed on the number of logical blocks that can contain data of a given file as well as data of some other file. Different limits may be utilized in different circumstances. In a specific example, data of the files are allocated to a number of logical blocks of the address space 161 in a manner that any one file can share no more than two logical blocks with data of another file. This constraint may be followed during assignment of logical block addresses to data of a particular file object by restricting the number of logical blocks that are allowed to be only partially filled with data of the file.

This restriction keeps low the amount of data relocation that may become necessary, for example due to data of the other file subsequently becoming obsolete. When that occurs, valid data of a given file is typically copied from the block containing obsolete data of another file into another block. By restricting the number of blocks the given file shares with data of another file, such data copy operations become less frequent. This improves the performance of the memory system.

Figure 10:
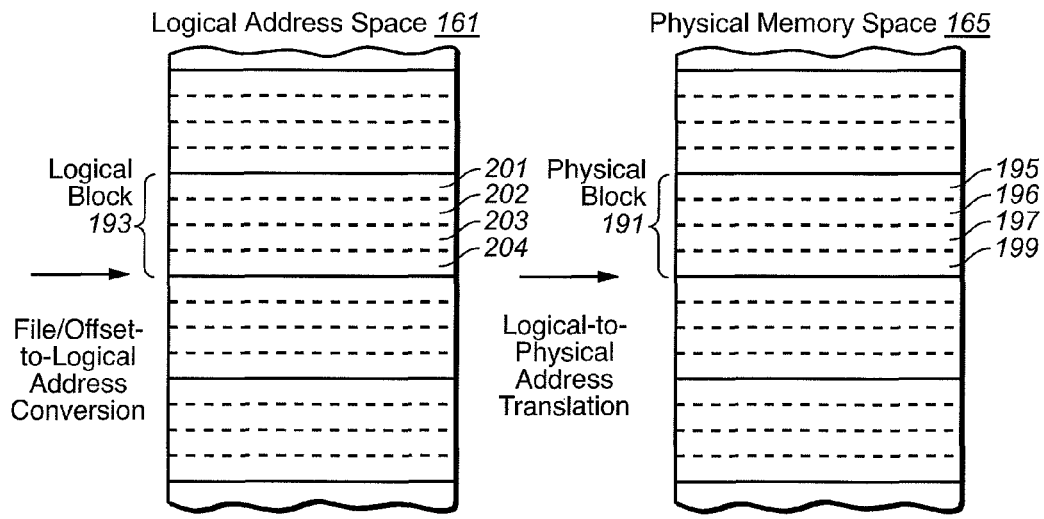
FIG. 10 illustrates an example of logical-to-physical block mapping that may be used to carry out the technique of FIG. 9C.

Referring to FIG. 10, the allocation of file data are illustrated in both logical and physical blocks. An example physical memory cell block 191 is divided into four pages 195-199 for purposes of illustration but an actual system will typically contain many more pages per block. Each page stores multiple sectors of data. Data are programmed one page at a time, typically in the order 195-199 through the block. If the memory system utilizes metablocks, the block 191 is a metablock and the pages 195-199 are metapages.

It is a logical block 193 of the logical address space 161 that is mapped into the physical block 181. The logical block 193 is defined to have the same data storage capacity as the physical block 191, and is also divided into the same number of pages 201-204 as the physical block 191, each logical page having the same data storage capacity as each of the physical pages 195-199. That is, the granularity of the logical address space is preferably made to be equal to the data storage capacity of a physical memory page or metapage. Data are assigned addresses of logical pages within the logical block 193 in the same sequence as pages of data are written in the physical block 191. Writing of data at the beginning of the first page 201 of the logical block 193 is made to start at the beginning of the beginning of the first page 195 of the physical block 191.

In order for this coordination of logical and physical functions to be maintained, a host that makes the file-to-logical block translation needs to know the physical characteristics of the memory with which it is operating. These characteristics may be, in an example of a memory system using metablocks, defined by the following parameters:

1. The size of a physical page in number of sectors of data it stores;
2. The size of a metapage in number of pages linked together to form an individual metapage;
3. The number of pages per metablock; and
4. The lowest logical address that is mapped to a first page of a physical metablock.

With this information, the host can configure the logical block structure of its logical address space 161 to operate in the manner illustrated by FIG. 10. If only one type of memory is to be used by a particular host, such as a memory embedded in the host, only one configuration of the host's logical address space need be maintained. But the more typical case is where portable memory devices having different physical characteristics are removably connected with a given host device, in fact with many different host devices. A capability is therefore provided within the host to adapt its logical block configuration to the physical block arrangement of a particular portable memory device connected with it. To accomplish this, data of the memory parameters listed above are stored in the memory device itself, in a manner that they may be read by a host. The controller of the memory system will typically change the physical block into which any particular logical block is mapped but this is not known to the host and does not affect its assignment of addresses of file data to the logical blocks.

Figure 11:
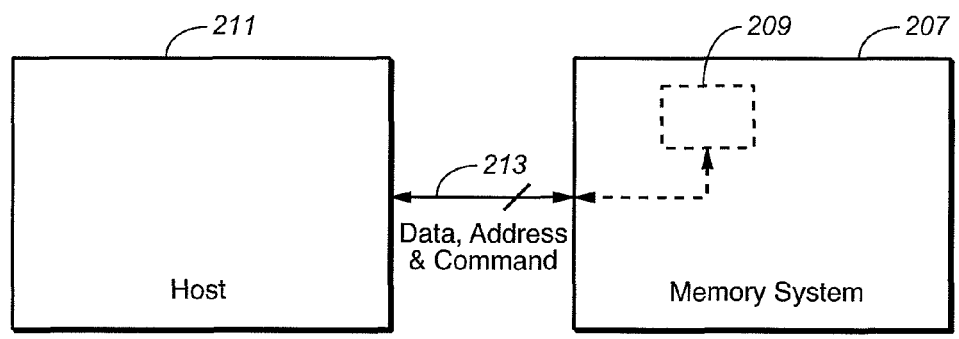
FIG. 11 shows interaction between a host and a memory system to set parameters to carry out the technique illustrated in FIGS. 9C and 10.

FIG. 11 illustrates a memory device 207 containing these parameter data in a non-volatile storage space 209 that is accessible by a host 211 through an interconnecting bus 213. There are many ways in which these parameters may be read by the host. One example is to define a vendor specific command that is issued by the host 211 to the memory device 207 during initialization of the memory device. The memory device 207 then operates to return the stored parameter values to the host. Another example is that these parameters may be included in unused portions of existing fields that the memory device 207 already returns to the host 211 in response to an existing standard command from the host. An example of such a command is the Identify Drive command.

Exemplary Flash Optimized File System

Further details are provided in this section of example implementations of the technique of mapping individual files to logical blocks of a continuous logical address space. Certain aspects of this have already been described with respect to the following functions that are essentially the same: the "Flash-Optimized File System" of FIG. 7C, the "Allocating Files to Logical Block Addresses" of FIG. 8C, and the "File/offset-to-Logical Address Conversion" 173' of FIG. 9C.

Much of what is described in this section for mapping files to logical block addresses utilize the same techniques of mapping files to physical memory cell block addresses that are described in the patent applications cross-referenced above. The primary difference is that the file mapping is being done across a LBA interface, such as by a host device, instead of bypassing the LBA interface by directly mapping the data files to physical memory blocks, as described in the prior cross-referenced patent applications. The physical memory block mapping techniques of the prior applications may alternatively be applied to map data file objects to logical blocks of a LBA address space, some examples of which are described herein.

In the description herein of logically mapping file objects, data are said to be "written to" or "programmed in" blocks of the LBA interface. These logical blocks, of course, do not actually store data, contrary to the physical memory blocks, so this refers to designating addresses of data to a particular logical block. Similarly, a logical block is said to be "erased" when no data are allocated to it. An "erased" logical block is one that does not contain addresses of data, so is fully available to have addresses of data assigned to it. Other logical blocks may be "partially erased," meaning that a portion of the logical block is available to receive additional addresses of data.

General Operation of the Flash Optimized File System

When a new data file is to be programmed into the memory, the data are written into an unoccupied logical block beginning with the first location in the block and proceeding through the locations of the block sequentially in order. The data are programmed within the logical block in the order received from the host, regardless of the order of the offsets of that data within the file. Programming continues until all data of the file have been written. If the amount of data in the file exceeds the capacity of a single logical block, then, when the first block is full, programming continues in a second empty (erased) block. The second logical block is programmed in the same manner as the first, in order from the first location until either all the data of the file are allocated or the second block is full. A third or additional blocks may be programmed with any remaining data of the file. Multiple logical blocks or metablocks storing data of a single file need not be contiguous. For ease of explanation, unless otherwise specified, it is intended that the term logical "block" as used herein refer to either a logical block having the same capacity as a physical block minimum unit of erase within the memory system, or a multiple block logical "metablock," which corresponds to a multiple block physical metablock that is typically erased together, depending upon whether metablocks are being used in a specific system.

Figure 12:
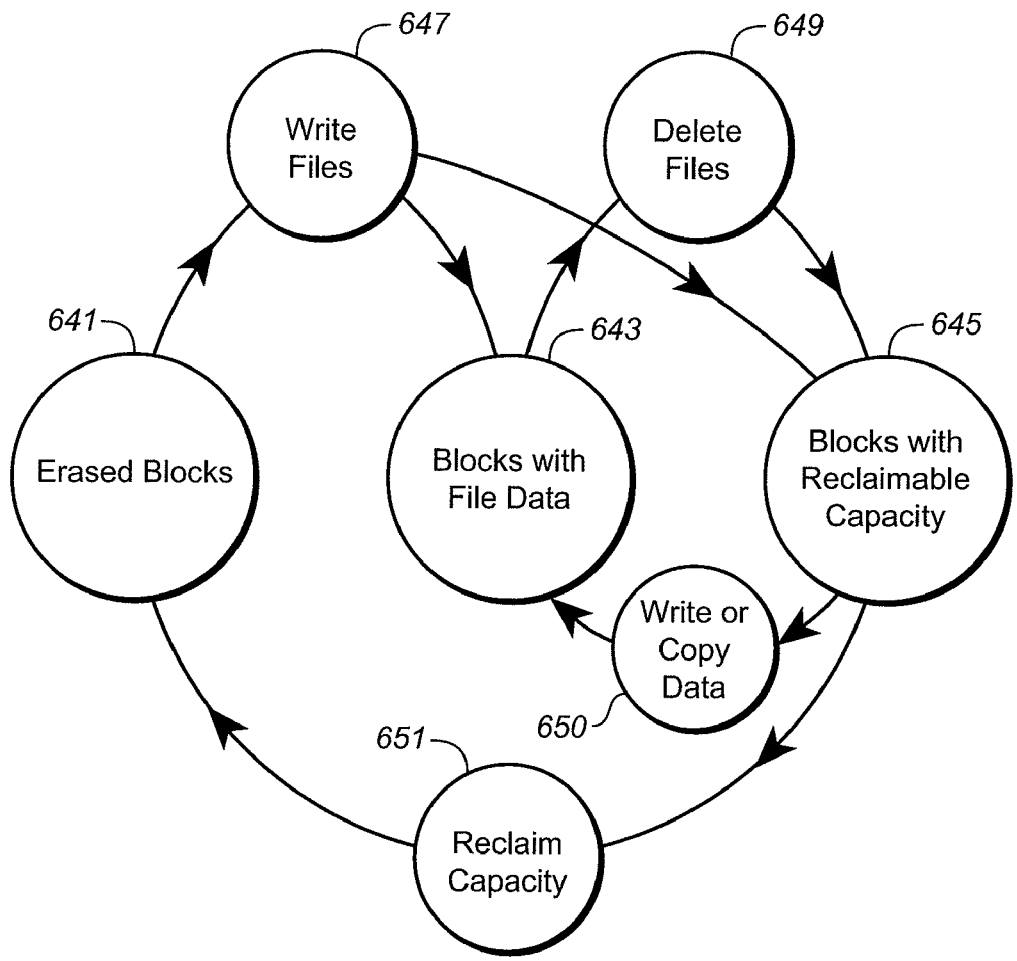
FIG. 12 illustrates an operating cycle of a direct data file system.

The diagram of FIG. 12 illustrates overall functioning of the flash optimized file system. Individual logical blocks may be viewed to be in one of three states. These are erased blocks 641, blocks 643 that are storing valid file data without reclaimable capacity and blocks 645 that may contain some valid file data but which also have reclaimable capacity from unprogrammed (erased) pages and/or obsolete (invalid) data stored in them. Data are written to erased logical blocks by a function 647, thereby to result in blocks in category 643 or 645, depending upon whether the resulting programmed blocks retain any reclaimable capacity. When files are deleted, as indicated by a function 649, blocks 643 containing data of the file are converted to blocks 645 with reclaimable capacity. Unused storage capacity of the blocks 645 is reclaimed by a function 651, after copying data in a function 650 from reclaimable blocks to other blocks, that results in returning those blocks to the status of erased blocks 641 to which new data may be written.

Referring to FIG. 13A, the writing of a data file to the logical address space is illustrated. A data file 181, in this example, is larger than the storage capacity of one block or metablock 183, which is shown to extend between solid vertical lines. A portion 184 of the data file 181 is therefore also written into a second block 185. These logical blocks are shown to have contiguous addresses but they need not be. Data from the file 181 are written as they are received streaming from the host until all the data of the file have been written into the logical address space. In the example of FIG. 13A, the data 181 are the initial data for file.

A preferred way for the memory system to manage and keep track of the stored data is with the use of variable sized data groups. That is, data of a file are stored as a plurality of groups of data that may be chained together in a defined order to form the complete file. As a stream of data from the host are being written, a new data group is begun whenever there is a discontinuity either in the logical offset addresses of the file data or in the logical address space to which the data are being allocated. An example of such a logical address space discontinuity is when data of a file fills one logical block and begins to be written into another block. This is illustrated in FIG. 13A, wherein a first data group fills the first block 183 the remaining portion 184 of the file is stored in the second block 185 as a second data group. The first data group can be represented by (F0,D0), where F0 is the logical offset of the beginning of the data file and D0 is the location within logical block 183 where the file begins. The second data group is represented as (F1,D1), where F1 is the file offset of data that is stored at the beginning of the second block 185 and D1 is the corresponding logical address of the beginning of the second block.

The amount of data being transferred through the host-memory interface may be expressed in terms of a number of bytes of data, a number of sectors of data, or with some other granularity. A host most often defines data of its files with byte granularity but then groups bytes into sectors of 512 bytes each, or into clusters of multiple sectors each, when communicating with a large capacity memory system through a current logical address interface. This is usually done to simplify operation of the memory system. Although the file-based host-memory interface being described herein may use some other unit of data, the original host file byte granularity is generally preferred. That is, data offsets, lengths, and the like, are preferably expressed in terms of byte(s), the smallest resolvable unit of data, rather than by sector(s), cluster(s) or the like. This allows more efficient use of the capacity of the flash memory storage with the techniques described herein.

The new file written to the logical address space in the manner illustrated in FIG. 13A is then represented in a file index table (FIT) as a sequence of index entries (F0,D0), (F1,D1) for the data groups, in that order. That is, whenever the host system wants to access a particular file, the host generates its fileID or other identification, which then accesses its FIT to identify the data groups that make up that file. The length <length> of the individual data groups may also be included in their individual entries, for convenience in operating the memory system.

So long as the host maintains the file of FIG. 13A in an opened state, a write pointer P is also preferably maintained to define the logical address for writing any further data received from the host for that file. Any new data for the file are written at the end of the file in the logical blocks regardless of the logical position of the new data within the file. The memory system allows multiple files to remain open at one time, such as 4 or 5 such files, and maintains a write pointer P for each of them. The write pointers for different files point to locations in different logical blocks. If the host system wants to open a new file when the system limit of a number of open files already exists, one of the opened files is first closed and the new file is then opened.

FIG. 13B illustrates the appending of data by the host to the end of the previously written but still open file of FIG. 13A. Data 187 are shown to be added by the host system to the end of the file, which are also written in the second block 185 at the end of the data for that file. The appended data become part of the data group (F1,D1), which therefore now contains more data, since there is neither a file nor a logical address discontinuity between the existing data group 184 and the appended data 189. The full file is thus still represented as a sequence of index entries (F0,D0), (F1,D1) in the FIT. The address of the pointer P is also changed to that of the end of the stored appended data.

An example of the insertion of a block of data 191 into the previously written file of FIG. 13A is shown in FIG. 13C. Although the host is inserting the data 191 into the file, the flash optimized file system appends the inserted data at a location 193 at the end of the file data previously written. It is not necessary to rewrite the data of the file in their logical order when data are being inserted into an open file, although this may be done later in the background after the host closes the file. Since the inserted data is stored entirely within the second logical block 185, they form a single new group (F1, D3). But the making of this insert results in the previous data group (F0,D0) of FIG. 13A being divided into two groups, one (F0,D0) before the insert and one (F2,D1) after the insert. This is because a new data group needs to be formed whenever there is a file discontinuity of the data, such as occurs at the beginning F1 of the insert and at the end F2 of the insert. The group (F3,D2) is the result of logical address D2 being the beginning of the second block 185. The groups (F1,D3) and (F3,D2) are maintained separate, even though they are stored in the same logical block, because there is a discontinuity in the file offsets of the data stored in them. The original file with the insert is then represented in the FIT by data group index entries (F0,D0), (F1,D3), (F2,D1), (F3,D2), in that order. It should be noted from the examples of FIGS. 13A, 13B and 13C, that new data for a new or existing file may be written without making obsolete any data represented by logical block addresses.

As an alternative to the insertion of data into an existing file that is illustrated in FIG. 13C, the file may be rewritten as a separate file by the host whenever data have been inserted. This separate file may then be treated by the memory system as a new file. The old file is then deleted by the host, and the system may respond by reclaiming the logical address space assigned to the old file is stored, the data of which are now obsolete.

FIG. 13D illustrates another example, wherein a certain portion of the data originally written in the manner shown in FIG. 13A is updated. A portion 195 of the data file is shown to be updated. Rather than rewriting the entire file with the update, an updated portion 197 of the file is appended to the data previously written. A portion 199 of the data previously written is now obsolete. After updating, the file is represented in the system FIT by data groups index entries (F0,D0), (F1,D3), (F2,D1), (F3,D2), in that order. The single data group (F0,D0) of FIG. 13A is again divided into pieces in FIG. 13D, one before the updated portion, the updated portion and one after the updated portion. It is desirable to reclaim the address space 199 occupied by obsolete data but this is preferably done later, not as part of writing the file data. Such reclamation will typically result in a fewer number of groups of data for a particular file being stored.

To further illustrate the use of variable length data groups, a sequence of several write operations involving the same file is shown by FIGS. 14A-14E in order. The original file data W1 is first written into two logical blocks of the continuous address space, as shown in FIG. 14A. The file is then defined by two data groups, the first group starting at the beginning of a logical block and the second group being required after a logical block boundary. The file of FIG. 14A is then described by the following sequence of index entries for the data groups: (F0,D0), (F1,D1).

In FIG. 14B, the host causes the file data written in FIG. 14A to be updated. Updated file data U1 are written immediately following the previous group (F1,D1), with the previous version of the updated data becoming obsolete. Previous group (F0,D0) of FIG. 14A is shortened to a revised group (F0,D0) of FIG. 14B, and previous group (F1,D1) is shortened to group (F4,D2). The updated data are written in two groups (F2,D3) and (F3,D4) because they overlap a boundary of logical blocks. Some of the data are stored in a third logical block. The file is now described by the following sequence of index entries for the data groups: (F0,D0), (F2,D3), (F3,D4), (F4,D2).

The file of FIG. 14B is further modified in FIG. 14C by the host causing insertion of new file data I1. The new data I1 are written into the logical blocks immediately following the previous group (F4,D2) of FIG. 14B, as new groups (F5,D6) and (F6,D7) of FIG. 14C because the inserted data overlap a boundary of logical blocks. A fourth logical block is used. The previous group (F0,D0) of FIG. 14B is split into shortened groups (F0,D0) and (F7,D5) in FIG. 14C, because of the insertion of the new data I1. The file is now described by the following sequence of index entries for the data groups: (F0, D0), (F5,D6), (F6,D7), (F7,D5), (F8,D3), (F9,D4), (F10,D2).

FIG. 14D shows the further modification of the data file of FIG. 14C that appends new data W2 to the end of the file. New data W2 are written immediately following the previous group (F10,D2) of FIG. 14C, as new group (F11,D8) of FIG. 14D. The file is now described by the following sequence of index entries for the data groups: (F0,D0), (F5,D6), (F6,D7), (F7,D5), (F8,D3), (F9,D4), (F10,D2), (F11,D8).

A second update to the open file is shown in FIG. 14E, where updated file data U2 are written to the file of FIG. 14D. The updated data U2 are written in FIG. 14E immediately following the previous group (F11,D8) of FIG. 14D, with the previous version of that data becoming obsolete. Previous group (F9,D4) of FIG. 14D is shortened to a revised group (F9,D4) in FIG. 14E, previous group (F10,D2) becomes fully obsolete, and previous group (F11,D8) is shortened to form a new group (F14,D9). The updated data are written in new groups (F12,D10) and (F13,D11) of FIG. 14E, overlapping a logical block boundary. A fifth logical block is now needed for the file. The file is now described by the following sequence of index entries for the data groups: (F0,D0), (F5, D6), (F6,D7), (F7,D5), (F8,D3), (F9,D4), (F12,D10), (F13, D11), (F14,D9).

The offsets of the data of each file are preferably maintained continuous in the correct logical order after the file's creation or modification according to the preceding description. Therefore, as part of an operation to insert data into a file, for example, offsets of the inserted data provided by the host are continuous from the offset immediately preceding the insert and data already in the file after the insert are incremented by an amount of the inserted data. Updating an existing file most commonly results in data within a given address range of an existing file being replaced by a like amount of updated data, so the offsets of other data of the file usually need not be replaced.

The granularity or resolution of the data so stored may be maintained the same as that of the host. If a host application writes file data with a one-byte granularity, for example, that data may be also be represented in the logical blocks with a one-byte granularity. The amount and location of data within an individual data group is then measured in a number of bytes. That is, the same offset unit of data that is separately addressable within the host application file is also separately addressable within that file when stored in the flash memory. Any boundaries between data groups of the same file within a logical block are then specified in the FIT to the nearest byte or other host offset unit. Similarly, boundaries between data groups of different files within a logical block are defined in the unit of the host offset.

The term "sector" is used herein with large block memories to denote the unit of stored data with which an ECC is associated. The sector is therefore the minimum unit of data transfer to and from flash memory when such an error correcting code is generated by the controller of the memory system and stored with the data. A "page," when referencing physical memory, is used to denote a unit of memory cells within a block. The page is the minimum unit of programming. A logical "page" within the logical blocks is one containing the same amount of data as the physical page. The term "metapage" is used to denote a page with the full parallelism of a metablock. The metapage is the maximum unit of programming.

It will be noted from FIGS. 14B and 14E that the Update command results in the logical address space taken by the file being greater than the amount of data in the file. This is because logical addresses for data that have been replaced by the updates remain. It is therefore highly desirable to consolidate (garbage collect) the data of the file into less logical address space by eliminating the obsolete, invalid data. More logical address space therefore becomes available for other data.

It may also be noted that in addition to the file data updates of FIGS. 14B and 14E, the data insert of FIG. 14C results in the addresses of the file data being out of order. That is, updates and inserts are added to the end of the file at the time they are made, while they are nearly always positioned somewhere within the file. This is the case of the examples of FIGS. 14B, 14C and 14E. It can therefore be desirable to reorder the data of the file across the logical address space to match the order of the offsets within the file. This then improves the speed of reading the stored data since reading the pages and blocks in sequence will give the data of the file in their offset order. This also provides the maximum possible defragmentation of the file. But reordering the file data to make reading more efficient is not as important to the performance of the memory system as is file data consolidation, which potentially frees up one or more logical blocks for addresses of other data. Reordering of the data in a file will therefore usually not be done by itself, where the benefit is not worth the added operating overhead, but can be done as part of many garbage collection operations with little or no added operating overhead.

The file of FIG. 14E includes obsolete data groups (gray portions) because of the two data updates U1 and U2 having been made. The amount of logical address space allocated to the file is, as a result, substantially greater than the size of the file, as is apparent from FIG. 14E. Garbage collection is therefore appropriate. FIG. 15 provides an illustration of the result of garbage collecting the data file of FIG. 14E. That file, before garbage collection, takes up nearly five logical blocks of address space (FIG. 14E), while the same file after garbage collection fits within slightly more than three blocks (FIG. 15). As part of the garbage collection operation, data are copied from the logical blocks where they are initially written into other erased logical blocks, and the original blocks are then erased. If an entire file is garbage collected, its data may be copied into the new blocks with a logical order that is the same as the data logical offset order within the file. The updates U1 and U2, and the insert I1, for example, are stored after garbage collection (FIG. 15) in the same order as they appear in the host file.

Garbage collection on a file basis also normally results in the formation of new and different data groups within the file being consolidated. In the case of FIG. 15, the file is described by the following new sequence of index entries for the new data groups: (F0,D12), (F1,D13), (F2,D14), (F3,D15). This is a far fewer number of data groups than exist with the state of the file shown in FIG. 14E. There is now one data group for each of the blocks into which data of the file have been copied. As part of the garbage collection operation, the FIT is updated to reflect the new data groups forming the file.

Reclaiming the blocks holding data of the file when in the state of FIG. 14E operates individually on blocks instead of on multiple blocks storing data of the same file. For example, if the second block 002 of FIG. 14E contained the least amount of valid data of any block of the address space being considered for a reclaim operation at a given time, its single data group would then be copied into another, erased block. The new block then contains a single data group (F8,D16) and the remainder of the block is erased capacity, into which new data may be written. That erased capacity has been reclaimed from the block in which that data was stored in FIG. 14E. The file is then described by the following sequence of index entries for the data groups making up the file: (F0,D0), (F5, D6), (F6,D7), (F7,D5), (F8,D16), (F9,D4), (F12,D10), (F13, D11), (F14,D9). The other blocks shown in FIG. 14E remain unchanged until they individually meet the criteria for a reclaim operation.

File Block Management

Certain types of logical blocks are recognized on the basis of the structure of file data stored in them. Each file with addresses in the continuous address space is then noted to be in one of a number of states, each file state being defined by the number and types of blocks in which data of the file are stored. When data are to be written for a file, its current state and permitted transitions from one state to another are preferably controlled to restrict the number of blocks containing data for a specific file that also contain data of one or more other files. This promotes the efficient utilization of the logical blocks and reduces the frequency of later reclaim operations necessary to maintain enough erased blocks for accepting new or copied data.

The core types of logical blocks recognized in this example that contain file data are as follows:

A "file block" has been fully programmed, and represents valid data of a single file. It may also contain addresses of some obsolete data.

A "program block" has been partially programmed, and represents valid data of only a single file. Some erased capacity remains in the block. It may also contain addresses of some obsolete data.

A "common block" has been partially programmed, and represents valid data of two or more files. Some erased capacity remains. It may also contain addresses of some obsolete data.

A "full common block" has been fully programmed and represents valid data of two or more files. It may also represent some obsolete data.

Another type of block is the "erased block", where there are no data addresses in the block, so its full capacity is available to accept data. When the logical address space of the LBA interface is full or nearly full of data addresses, a pool of a specified minimum number of erased blocks is typically maintained by continuously reclaiming unused capacity that exists within the logical blocks that are being used.

A "fractal block" is a collective term that refers to a program block, a common block or a full common block. A fractal block for a file contains valid data of the file, together with either un-programmed storage capacity, valid data for other files, or both. A primary purpose of the techniques described herein is to minimize the number of fractal blocks in the address space by managing the type of active block that is designated to receive data of a file. This reduces the instances of garbage collection and data consolidation (block reclaim operations) necessary to be performed in the logical address space in order to maintain the specified minimum number of erased logical blocks. The rate at which data may be written into the memory is then increased since less time is taken for internal copying of data to reclaim fragments of unused capacity in previously programmed blocks.

Additional terms are also used herein to collectively describe other types of blocks:

A "partial block" contains some un-programmed capacity, addresses of valid data of one or more files and may represent some obsolete data. The program block and common block are examples of partial blocks.

An "obsolete block" is a file block or a full common block that contains addresses of some obsolete data. The obsolete block does not have any erased capacity, and represents both valid and obsolete data.

An "invalid block" contains no valid data. The invalid block contains addresses of at least some obsolete data and may contain erased capacity but does not represent any valid data.

Figure 16A:
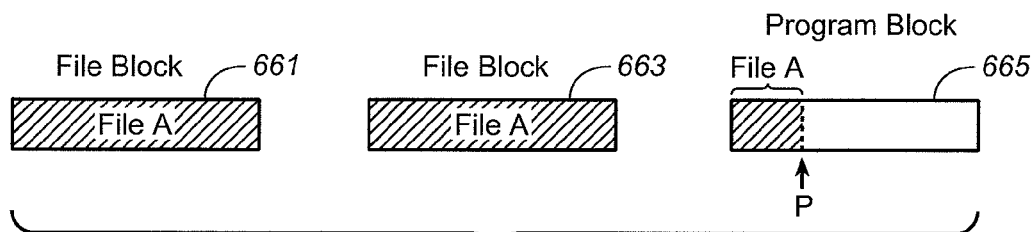
FIGS. 16A-16D show examples of a data file stored in various allowed combinations of types of blocks.

FIGS. 16A-16D illustrate some examples of the uses of the types of logical blocks defined above. In FIG. 16A, data of a file A have filled blocks 661 and 663, and partially filled a third block 665. Data are written from left-to-right in each block of this example, first filling the block 661, then the block 663 and thereafter being written into a portion of the block 665. The remaining portion of the block 665 is un-programmed erased capacity that can store additional data. The blocks 661 and 663 are file blocks, by the above-listed definitions, and the block 665 is a program block. Any new data will be written into the block 665, beginning at the program pointer P. The pointer P moves from left-to-right as data are written to the block to always point to the next available storage location in the block. Such a pointer is maintained for individual blocks that retain un-programmed erased capacity, whether currently active or not, so that the logical address of any other data to be written to the block are always known.

Figure 16B:
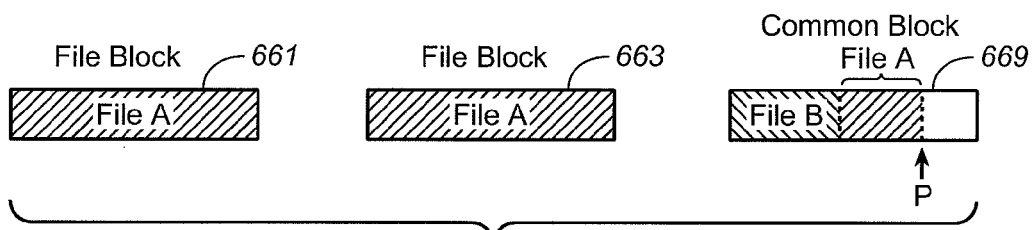

The example of FIG. 16B includes a block 669 that is a common block since it contains data of another file B as well as data of the current file A, plus some un-programmed capacity. New data are written into the block 669 at the end of the file A, beginning where the program pointer P is shown. Block 669 is the active block for file A. It may also be the active block for file B, in which case additional data of either of files A or B may be written at the program pointer P. Alternatively, a separate block (not shown) may be the active block for file B.

Data of a file may be written directly into erased capacity of a partial block that already contains data of another file, rather than into an erased block, in order to make good use of un-programmed capacity in this form. This is particularly useful when a known quantity of file data less than the capacity of a full block is to be written. Existing partial blocks are searched to find an amount of erased capacity that fits the known amount of data to be written. The number of pages (or metapages if the metablocks are being used) of data is compared with the number of pages of unprogrammed capacity in partial blocks. When unused erased space of a program block is programmed in this way, it is converted into a common block.

Figure 16C:
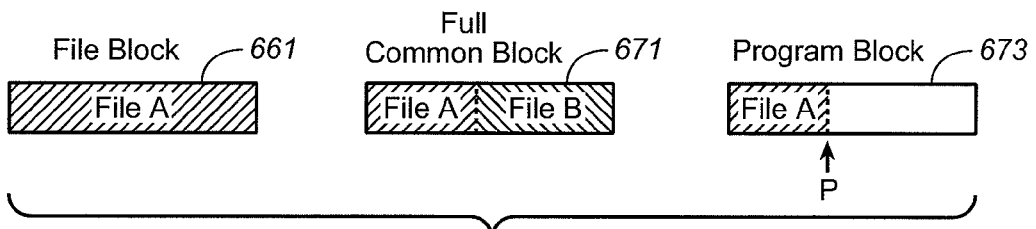

In FIG. 16C, file A is stored in the file block 661, a portion of a block 671 and a portion of a block 673. The block 671 is a full common block since it is full of data of two files A and B. The block 673 is a program block, similar to the block 665 of FIG. 16A. The block 673 is the active block for the file and a pointer P points to the location of the unused capacity within the block 673 where additional data will first be written.

Figure 16D:
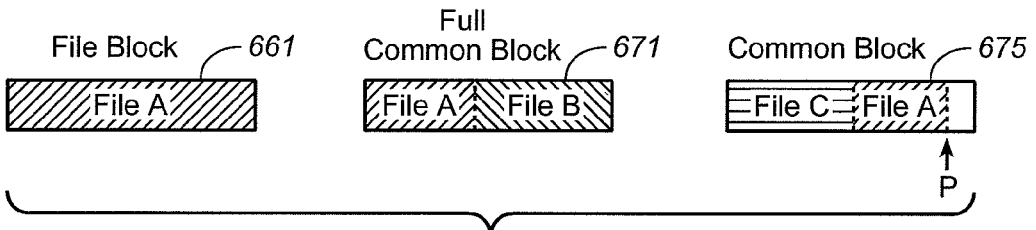

The file A is written in the example of FIG. 16D into a portion of the full common block 671 and a common block 675. The block 675 contains data of a third file C. The pointer P points to the first location in the unused portion of the active block 675 where additional data will be written.

Although the examples of FIGS. 16A-16D show data of file A stored in multiple blocks in order to illustrate the several different types of blocks, a file in many cases may be small enough to be stored in a lesser number of blocks, even a single block. The techniques described herein are also applicable to such small files. Also, a larger file can occupy pages in more than three blocks.

It will be noted that logical blocks 665, 669, 671, 673 and 675 are fractal blocks. It is desired to minimize the number of fractal blocks occupied by data of any one file since their presence increases the likelihood of the need to reclaim unused capacity in them and thus adversely affect system performance. Unused erased capacity exists in partial logical blocks 665, 669, 673 and 675 but it may not be efficient to write new data from a host directly into this space unless the quantity of unwritten data for a file is known and that known amount matches the unused capacity of one of these blocks. It is most common that the amount of data from the host for a particular file is not known, so these bits of capacity are not readily filled. Data may therefore need to be moved from another block into the unused space during a reclaim operation in order to make efficient use of the memory capacity. Blocks 669, 671 and 675 contain data of more than one file, which means that when one of the files is deleted or its data stored in the common block becomes obsolete, data reclaim will likely be done to reclaim the capacity of the block occupied by addresses of obsolete data.

Therefore, in order to reduce the number of time consuming data reclaim operations, data of a particular file are allowed to be stored in only one, two or some other number of fractal blocks at any one time. In determining the number of fractal blocks to be permitted, the benefits of being able to use them are balanced against the adverse impact of having them. In the specific example described herein, data of any one file may be stored in two or fewer fractal blocks but no more. A process of designating a new active block to store data of a file is so constrained. One of a set of permitted file states is assigned to each file that is defined by the types of blocks in which data of the file are stored. When a new active block needs to be assigned for receiving data of a particular file, such as when an existing block becomes full, the type of block so designated depends upon the state of the file and, in many cases, also other factors.

Figures 17, 18:
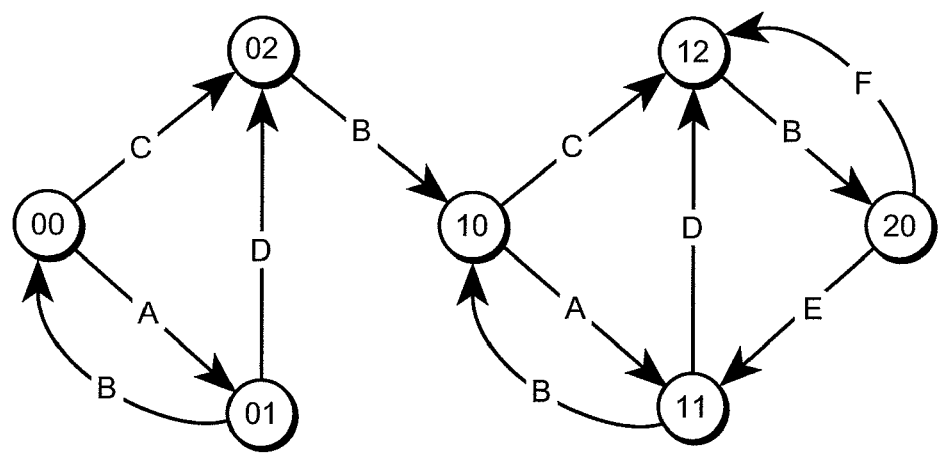
FIG. 17 is a table that gives the permitted states of files, according to a specific example.
FIG. 18 is a state diagram that shows permitted file state transitions due to programming data.

Definitions of seven permitted file states 00-20 are given in the table of FIG. 17, in terms of combinations of fractal blocks containing data for the file, in a specific implementation. Each of the permitted file states allows storage of data in no more than two fractal blocks. There is no restriction on the number of file blocks in which data of a file may be stored. The state of a file is a property that is used to control the selection of a block to be used as the active block for the file. A block that has been selected as the reclaim block is not treated as a fractal block, because any data for a file that is present in the reclaim block does not contribute to determination of the state of the file, since the reclaim block is transitory. The state of every file that exists in the device is monitored and recorded in the FIT, together with the file data indexing information. The state recorded for a file is updated whenever any state transition occurs.

File state transitions are subdivided into three classifications, depending on whether they are associated with programming data, with data being made obsolete, or with a reclaim block being selected. Permitted transitions in the file states due to a pending or completed data programming operation are illustrated in the state diagram of FIG. 18. The seven file states are indicated by circles with the file state identifying numbers from the table of FIG. 17 therein.

Labels on the state transitions of FIG. 18 have the following meanings:
 A—An erased block is allocated as the active block for the file;
 B—A partial block has been filled;
 C—A partial block is allocated as the active block for the file;
 D—A partial block for this file is allocated as the active block for another file;
 E—A data transition is made to an erased block that is allocated as the active block; and
 F—A data transition is made to a partial block that is allocated as the active block.

Most state transitions occur automatically when a block is allocated or a block becomes full. However, some of the defined state transitions also incorporate relocation of specific data from one block to another. The data is relocated as a single uninterrupted operation, and the state transition is considered to have occurred only after completion of the data relocation. Such transitions are designated "data transitions". The table of FIG. 19 provides details of the permitted state transitions, with reference to the state diagram of FIG. 18.

Partial blocks may be allocated as active blocks when the data to be written is of known length. In such case, the "best fit" partial block is selected from the population of partial blocks in the device. "Best fit" is defined as a partial block having an amount of erased capacity that the known amount of data to be written can efficiently utilize. In some cases, the "biggest" partial block may be selected as an alternative if a "best fit" partial block does not exist. This is the partial block with the highest amount of available unused capacity.

Figure 20:
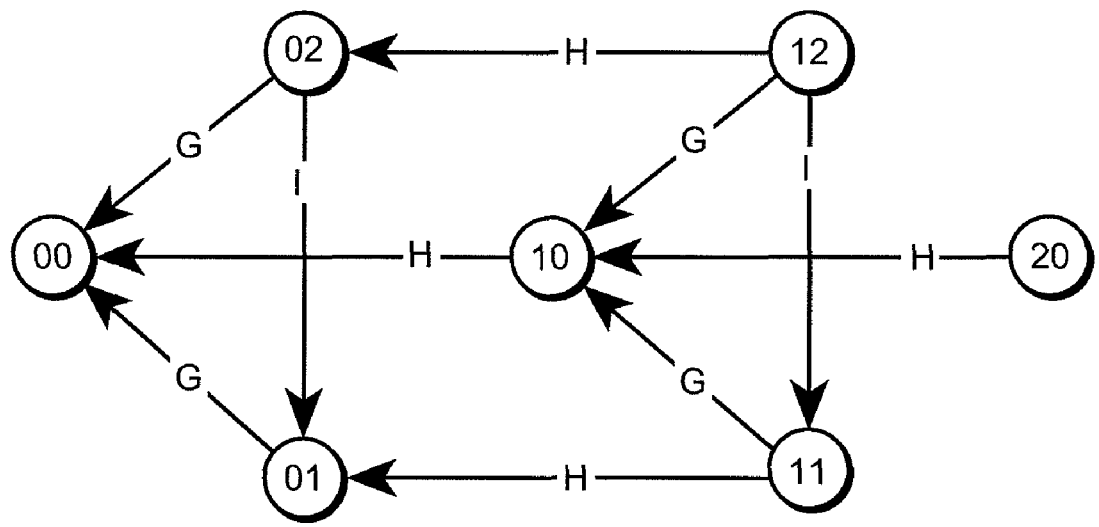
FIG. 20 is a state diagram that shows permitted file state transitions due to obsolete data.

FIG. 20 is a state diagram that illustrates file state transitions due to data becoming obsolete. These state transitions for a specific file occur when all data for a file stored in a fractal block containing data of the specific file become obsolete. The file for which data have become obsolete need not be the specific file. Data may be made obsolete by any of four events:
 1. A file is deleted by a host;
 2. Data within a file is deleted by a host;
 3. Data previously written for a file is updated by a host; or
 4. Data for a file is relocated during a reclaim operation.

Labels on the state transitions of FIG. 20 have the following meanings:
 G—All data for this file in a partial block has become obsolete;
 H—All data for this file or for all other files in a full common block has become obsolete; and
 I—All data for all other files in a partial block has become obsolete.

The table of FIG. 21 provides details of the file state transitions due to obsolete data that are illustrated in FIG. 20. The rendering of data to be obsolete in any of these circumstances causes the types of the blocks in which the obsolete data are located to change, with a resulting change in the state of a file.

When a block is selected as the reclaim block, it is no longer treated as a fractal block for files whose data exists in the block. This results in the file state transitions illustrated by the state diagram of FIG. 22. Labels on the state transitions of FIG. 22 have the following meanings:
 J—Partial block is selected as the reclaim block; and
 K—Full common block is selected as the reclaim block.

Details of the file state transitions due to the selection of a reclaim block are given in the table of FIG. 23.

There are two alternative schemes for aligning data of files with the logical blocks of the continuous logical address space. In the case of the direct data file system operating on physical memory cell blocks, as described in the patent applications cross-referenced above, the start of a new file is preferably aligned to the beginning of an erased memory cell block. This may also be done when the direct data file system operating with logical blocks, as illustrated in FIG. 24. Three files A, B and C are illustrated to be stored in logical blocks 1-7. When all the data of one of these files has been written, it will be noted from FIG. 24 that the last portion of a file occupies a fraction of a partial block.

The table of FIG. 25 provides the criteria for determining the type of logical block that to be allocated as an active block to store data of a file. As indicated, this depends on the existing state of the file (as defined by the table of FIG. 17) and the prevailing condition of the data to be programmed. Even when one of the allocation cases is selected on this basis, the type of block must further be selected from among a limited set of possibilities, as indicated in the right hand column of FIG. 25, depending upon availability. For allocation case B, for example, a partial block is a priority for receiving the data of a known length. A partial block is first sought that has just enough available (erased) capacity to store this known amount of data. But if that is not available, it is determined whether a partial block having the most unprogrammed space exists. If not, as a third priority, a fully unallocated (erased) block is then designated to receive the data, which will result in a partial block since the known amount of data to be written, in this example allocation case B, is less than the amount that will fill a full block.

A file, such as one of the files A, B, or C in FIG. 24, that has remained in the same state as when it was first written may be deleted without the consequent need to relocate data for any unrelated files. But if a reclaim operation has consolidated data for a file's partial block with data of another file, the file may be deleted with a need to relocate data of the other file from only one block. For example, if data for file A from block 2 has been consolidated with data for file C in block 7, then either file A or file C may be deleted with the consequent need to relocate data from only the one block 7.

Block reclaim is a process that is interleaved with the process of writing file data, wherein valid data is relocated from a block undergoing reclaim, in order to allow the block to be erased (all its capacity designated as unallocated) to reclaim unused capacity in the block. A block can be selected for reclaim for either of two reasons:

1. The block contains obsolete data as a result of a file having been deleted or updated; or
2. The block is a partial block and contains un-programmed capacity.

The proportion of time allocated to the reclaim process is preferably constant, so that a constant speed of writing new file data can be maintained. This is difficult to achieve, as file write process generates an unpredictable number of partial blocks that have to be dealt with by the reclaim process.

The benefit of the file-to-block mapping scheme shown in FIG. 24 is that it allows partial blocks containing the most recently written data for files to persist for as long as possible, until they are selected as the source or destination block for a reclaim operation. This increases the probability of a file being able to be deleted before any of its data, or data of an unrelated file in a common block, is relocated. This is because data for the file are contained in blocks that are dedicated to that file. Since no reclaim operation is necessary, no time to copy data is necessary and the memory system therefore operates more efficiently.

A disadvantage of the mapping scheme of FIG. 24 is that one partial block is normally created for each file written, and consolidation of data of many partial blocks will usually be required in order to reclaim their available un-programmed (erased) capacity. Further, if the memory controller manages the physical memory in way that automatically consolidates data from partially written blocks in order to reclaim new erased block capacity, a large amount of time consuming data copying can result from the mapping scheme of FIG. 24. Therefore, it may be desirable to implement an alternative mapping scheme of FIG. 26 instead. The primary characteristic of this scheme is that data at the start of a new file abuts data for an unrelated file that previously occupied a partial block. When all the data of a file has been written, the last written data will most commonly occupy a fraction of a partial block but only temporarily. The un-programmed space in the partial block is soon filled with data for a new file that is written to abut the completed file.

An implementation of the scheme of FIG. 26 for allocation of active blocks for writing data is given in the table of FIG. 27. Allocation case A in the table of FIG. 25 is replaced in the table of FIG. 27 by allocation cases A1 and A2, defining separate cases for new and existing files.

In FIG. 26, data for both the start of a file and the end of a file generally shares a block with data of unrelated files, and data have to be relocated from two blocks when a file is deleted. For example, if file B is deleted, data for file A are relocated from block 2 and data for file C from block 3. This then enables blocks 2 and 3 to be erased and added to a pool of erased (unallocated) blocks into which other data may later be written.

A benefit of the file-to-block mapping scheme of FIG. 26 is that it eliminates the accumulation of partially programmed blocks. Because the start of data for a new file to be written abuts data for an unrelated existing file in a partial block, partial blocks containing the most recently written data for a file do not persist for a long period and very few partial blocks therefore exist in the device. This restricts the occasions on which data from partial blocks must be consolidated during reclaim operations, and allows a constant reclaim rate to be established to let a constant write speed for new file data to be maintained.

A disadvantage of the mapping scheme of FIG. 26, however, is that it increases the probability that data for unrelated files needs to be relocated when a file is deleted, and increases the amount of data that must be relocated on each occasion. This disadvantage of increased data relocation in the scheme of FIG. 26 when a file is deleted negates the advantage over the scheme of FIG. 24 of a reduced incidence of consolidation of data from partial blocks during reclaim operations.

Reclaiming Block Capacity

As described above, part of the block management includes reclaiming unused capacity in blocks for the storage of new data. This is not of particular concern when the amount of data stored in the memory system is far less than its capacity but a memory system is preferably designed to operate as if it is full of data. That means that blocks which contain only obsolete data, and other blocks that contain valid data but also have some obsolete data and/or unwritten pages, can be dealt with in a manner to reclaim this unused capacity. The goal is to utilize the storage capacity of the memory system as completely as possible, while at the same time minimizing adverse effects on performance of the system.

Any valid data in a block designated for a reclaim operation (source block) is copied into one or more blocks (destination blocks) with sufficient unallocated (erased) capacity to store the valid data. The destination block is selected in accordance with the block management techniques described above. The data of each file stored in the source block are copied to a type of block that is selected on the basis of the state of file and other factors, as described above. Examples of data copying between different types of files as part of reclaims operation are given in FIGS. 28A-28D.

Figure 28A:
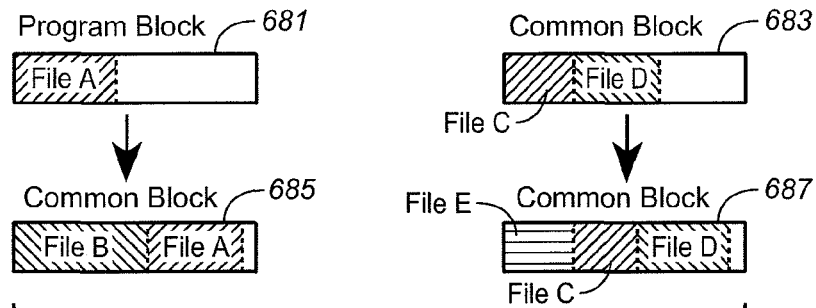
FIGS. 28A-28D show examples of block reclaim operations.

In FIG. 28A, reclaim operations on two partial blocks 681 and 683 are illustrated, as examples. The block 681 is a program block in which valid data of a file A are stored, while also containing erased capacity storing no data. One possible reclaim operation, depending upon the state of file A, is to copy data of file A of block 681 into available erased capacity of another partial block 685 that already includes data of a different file B, thus making it a common block. The data group(s) in the block 681 is then no longer referenced in the FIT and the block is noted to be obsolete. When stored in block 681, file A had one of the states (see FIG. 17) including a program block. The data may then be moved to another fractal block while the file remains written to a maximum of two fractal blocks. After copying to block 685, file A has transitioned to one of the states (see FIG. 17) that includes data of the file being stored in a common block, depending on the types of blocks in which other data of the file are stored.

The block 683 of FIG. 28A is a common block that is being reclaimed by copying its stored data of files C and D into erased capacity of a program block 687 containing data of file E, which then becomes a common block. The data of files C and D in the block 683 are then obsolete, as is the block itself. The state of each of the files C and D has not changed since the data have been moved from one common block to another. However, the state of file E has changed. Alternatively, the data of each of the files C and D can be moved to different blocks from each other and need not necessarily be copied to available space of a common block. The states of the files could then possibly transition to other states.

Figure 28B:
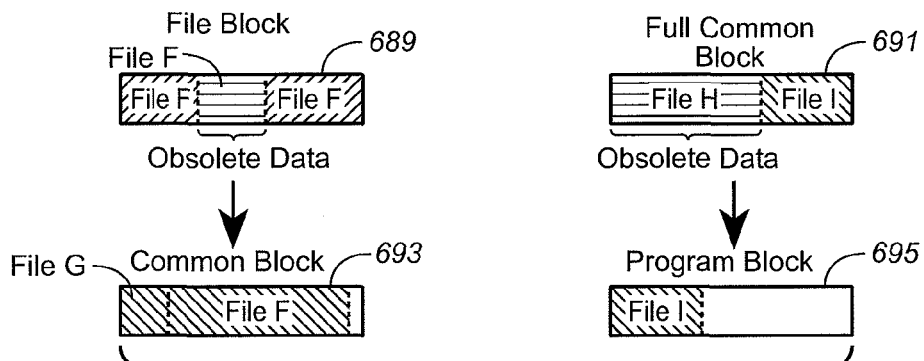

Illustrated in FIG. 28B are reclaim operations on example blocks 689 and 691. Each of these blocks is an obsolete block since it is full of data, both valid and obsolete. The block 689 is a file block containing data of a file F, a portion of which are obsolete and the remainder valid. This can occur, for example, during an update of file F where new data are written to addresses at the end of the file that have the same logical offsets as existing data of the file, and the existing data then become obsolete. In this example, the data of File F are copied into erased capacity of a program block 693 containing data of a file G, resulting in changing the type of block 693 to a common block. The valid data of the file F could alternatively be written to an erased block, which would then result in the block being a program block.

The block 691 of FIG. 28B is a full common block containing invalid data of file H and valid data of file I. The valid data of file I is copied, in this example, from the block 691 into an erased block 695. The block 695 then becomes a program block. Alternatively, the data of file I could be written to a partial block containing data of another file, if a good fit can be found. The destination block will depend upon the state of file I at the time of the reclaim operation.

Figure 28C:
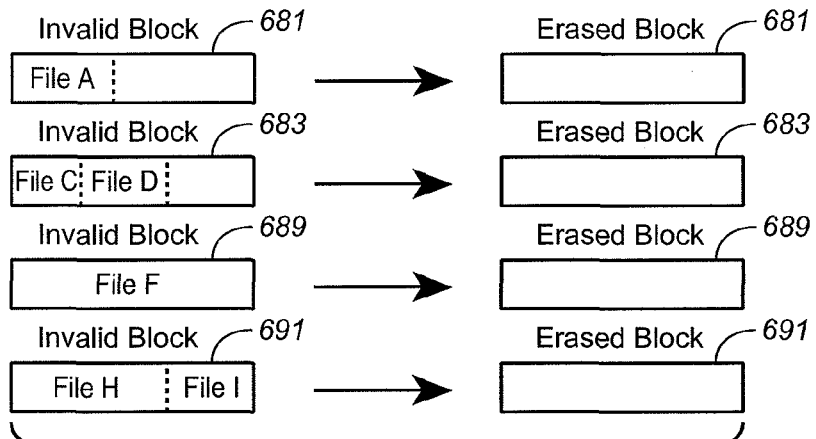

As a result of each of the four specific examples of reclaim operations shown in FIGS. 28A and 28B, data stored in two partial blocks are combined into one, thereby leaving the other of the two blocks with only obsolete data. They are then invalid blocks. The entire space of each of the original blocks 681, 683, 689 and 691 is then reclaimed by erasing the block, as illustrated in FIG. 28C. An erased block is the result of reclaiming an invalid block.

Figure 28D:
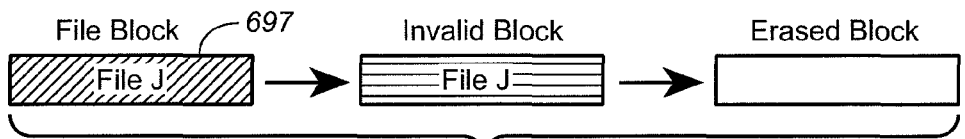

FIG. 28D shows an example of a file block 697 in which data of a file J are stored. When file J is deleted by the host, the data of file J in block 697, and possibly also in other blocks, are rendered obsolete. The block 697 then becomes invalid. Reclaiming the invalid block provides an erased block for the system erased block pool.

The deletion of a file from the memory also commonly causes data of the file in one or more fractal blocks, such as a common block or a full common block, to become obsolete. That block is then subject to a reclaim operation since the remaining valid data of another file will be less than the storage capacity of the block and can be a small amount.

Figure 29:
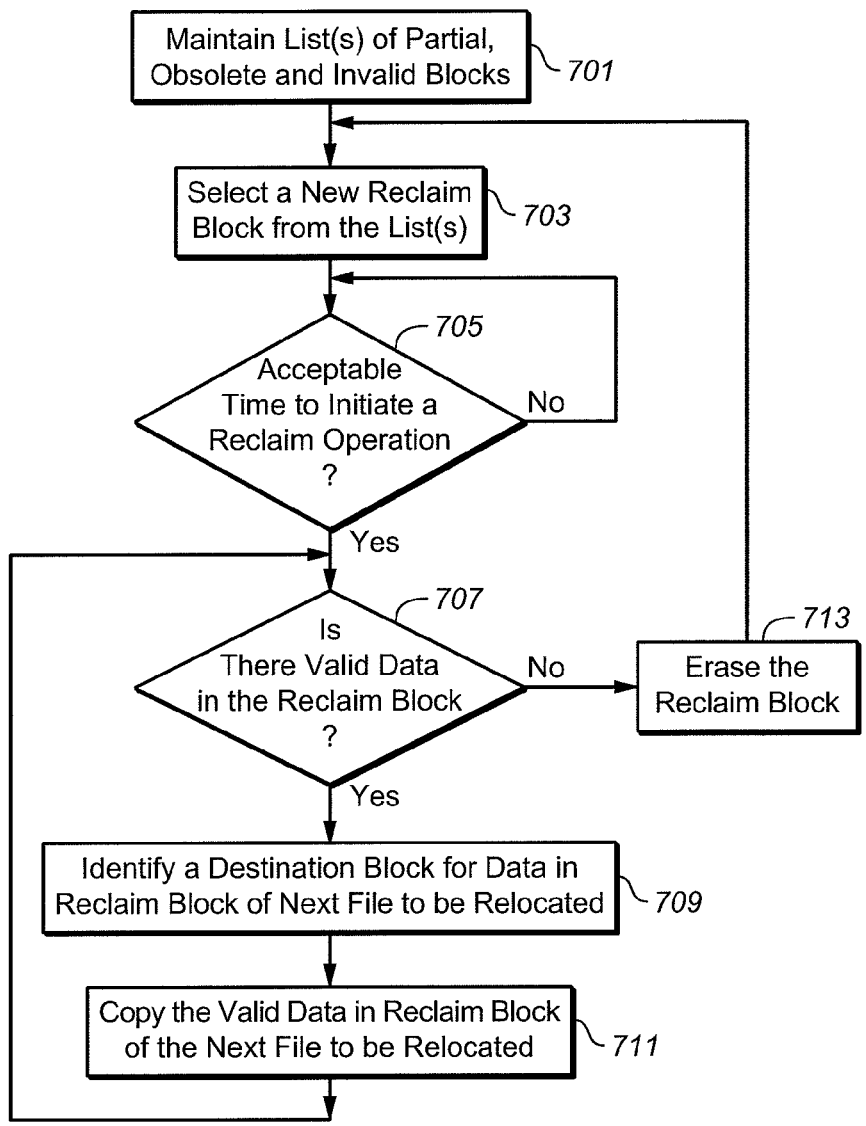
FIG. 29 is a flowchart that illustrates a reclaim operation in general terms.

A reclaim operation is shown in general terms by a flowchart of FIG. 29. One or more lists are maintained for partial, obsolete and invalid blocks, depending upon the specific embodiment, as indicated by a step 701. According to one technique, this list(s) of blocks is built at the time of initiation of the memory system, such as when power is first applied. This list(s) can include other information of the blocks that enable the selection of one reclaim block at a time, such as the amount of valid data in each block and the amount of erased space in each block. These quantities are typically measured in terms of a number of pages of the block, or metapages if metablocks are being used. A preferred alternative technique is to maintain these lists in non-volatile memory and to add or update an entry for a block in the list whenever its status changes. With this technique, it is not necessary to scan the blocks and build the lists when the memory system is initialized. As an alternative to keeping all partial, obsolete and invalid blocks on the list(s), only those blocks that have a small amount of valid data below some set threshold amount are included, since one characteristic of a chosen reclaim block is that it has little or no valid data that needs to be copied. It is the copying of data from one block to another, necessary in many reclaim operations, which takes a significant amount of time, so this is usually performed first on those blocks having the lesser amount of data to be copied.

The list(s) of such blocks changes constantly as data are written, updated, moved, deleted, and so forth. Changes that result in blocks changing their types to and from partial, obsolete and invalid cause the list(s) maintained by the step 701 of FIG. 29 to change. Changes in the amount of valid data individually stored in such blocks, and in the amount of erased capacity are also noted in the block lists.

In a step 703, a single reclaim block is preferably identified from those on the updated list(s) as the next in order to be reclaimed. If a partial or obsolete block, it is a source of valid data to be copied into another block referred to as a destination block. Several specific techniques that may be used to select the source block are described below.

A next step 705 of FIG. 29 then determines whether it is appropriate to perform the reclaim operation at the current time, considering the memory operations that need to be performed in response to commands of a host. If the host has issued an idle command, or something similar that indicates there will be some period of time when the host will not be expecting the memory system to perform a particular operation, then the system is free to carry out overhead operations in the foreground including a reclaim operation. Even if the host is busy writing data to or reading data from the memory system, the reclaim operation, particularly its data copying, can be interleaved with data write and read operations. Such interleaving is described for application to physical memory cell blocks in U.S. patent application Ser. No. 11/259,423 of Alan Sinclair, filed Oct. 25, 2005, and Ser. No. 11/312,985 of Alan Bennett et al., filed Dec. 19, 2005.

If it is determined by the step 705 of FIG. 29 that a reclaim operation may be carried out, the process differs depending on whether the identified reclaim block contains valid data, and, if so, whether it contains valid data of more than one file. If a partial block or obsolete block, it will, by definition, contain valid data, and, if a common block or a full common block, will contain valid data of two or more files. Whether or not there is valid data in the reclaim block is determined by a step 707. If there is valid data that must be moved, data of a single file are identified and a destination block is identified to receive that data, in a next step 709. The destination block is identified by the process described above with respect to FIGS. 17-19, in order to maintain all the data of the file to which the valid data belongs stored in two or fewer fractal blocks (in this example). Copying of the valid data of one file from the source reclaim block to the destination block is then begun, as indicated by a step 711. After these data are copied, the processing returns to the step 707 to determine whether data of another file remains. If so, the process of steps 709 and 711 are repeated for the additional data. The destination block is selected independently of the earlier selection for data of a different file. This continues until it is determined in the step 707 that there is no more data in the source block to be moved, in which case the source block may be erased, per a step 713. This block may then be placed into the erased block pool for use to store new data.

Returning to the step 707 of FIG. 29, if the source block contains no valid data, which is the case for an invalid block, there is no valid data to be moved. The source block only needs to be erased. The processing therefore, in that case, bypasses the steps 709 and 711, as shown in FIG. 29.

In a first embodiment of the process of FIG. 29, a single list is maintained by the step 701 of partial, obsolete and invalid blocks. The amount of valid data in the block is included in the individual entries on the list. In the step 703, the block selected from the list as the reclaim block is that having the least valid data. If there is one invalid block on the list, that block will be selected first since it has no valid data. If there are many invalid blocks on the list, the one that has been there the longest is chosen. If there is no invalid block on the list, then a block having the least amount of valid data is chosen as the reclaim block. By choosing the block having the least amount of valid data of all the blocks on the list, the reclaim operation then takes less time than when there is more valid data to be copied from one block to another. As a result, other operations of the memory system, such as the speed of writing data to and reading data from the memory, are maintained at a high rate. A newly erased block is obtained at a lesser cost to memory performance.

This first embodiment of the process of FIG. 29 for selecting a source block on the basis of the amount of valid data in fractal blocks on a single list has an advantage of being relative simple to implement. However, this process may be refined by also considering the value of partial blocks. Partial blocks have erased capacity into which data may be written, while neither the obsolete block nor the invalid block contains any erased capacity. Before obsolete blocks may be used for storing new data, any valid data must be moved out of them and into another block, so that they may then be erased and made available for the storage of new data. But partial blocks have erased capacity into which data may be written without having to endure the overhead of a reclaim operation. It may not be beneficial, for example, to reclaim a partial block only because it contains the least amount of valid data when it also contains a large amount of erased capacity into which data may be written.

Figure 30:
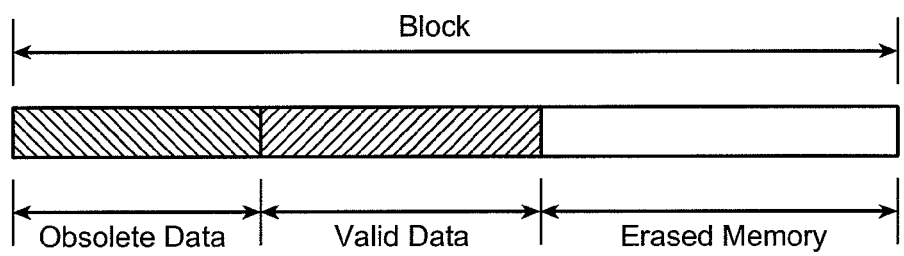
FIG. 30 illustrates types of data stored in a typical partial memory cell block.

Therefore, in other embodiments of the process of FIG. 29, a partial block is selected as a candidate for the reclaim source block on the basis of both the amount of valid data and the amount of erased capacity that exist in the partial blocks. The components of data in a partial block are shown in FIG. 30. The block (can be a metablock) has a certain number of one or more pages (can be metapages) containing valid data and one or more other pages that are erased and into which data may be written. The partial block may also contain one or more other pages that contain obsolete data, as shown in example of FIG. 30.

In these other embodiments of the process of FIG. 29, the partial blocks are preferably maintained by the step 701 in a list that is separate from list(s) of obsolete and invalid blocks. Partial blocks are moved toward a head of their list for a reclaim operation when they have little erased capacity (which means that they are not very useful in their present state) and small amounts of valid data that need to be moved. Such blocks will primarily contain obsolete data. Conversely, partial blocks having large amounts of erased capacity (meaning that they are potentially useful to store data) and large amounts of valid data to be moved will be the least likely to be identified as candidates for the reclaim block. Reclaiming a partial block with erased capacity does not add the same amount of storage capacity to the logical address space as does reclaiming an obsolete block. Invalid blocks are clearly the most attractive blocks to reclaim since they have no beneficial erased capacity and no valid data that need to be copied.

In a second embodiment of the reclaim block identification step 703 of FIG. 29, three separate lists are maintained by the step 701, one for each of the partial, obsolete and invalid blocks. If there are invalid blocks, the reclaim block is selected from the list of invalid blocks until there are no more blocks on that list. There is no particular order of listing invalid blocks except possibly in a first-in first-out (FIFO) order so that the invalid block that has been on the list the longest is chosen first. Next, if there are no invalid blocks, a block is chosen from the obsolete block list that has the least amount of valid data of all the blocks on that list.

If there are no blocks on either of the invalid or obsolete lists, then a block on the partial block list is chosen in step 703 as the reclaim block. Although a partial block could be chosen to be that with the least amount of valid data, it is preferred to rank the partial blocks in a way that recognizes the benefit of their erased capacity. For this purpose, a "reclaim gain" can be calculated for each partial block, as follows:

$$\text{reclaim gain} = (S - kE)/V \quad (1)$$

where S is the block size in terms of its total number of data storing pages, E is the number of pages of erased capacity into which data may be written and V is the number of pages containing valid data that needs to be moved to another block. A constant k is included to weight the positive effect of the erased capacity of the block but can be set at 1. As the value of kE increases, the resulting reclaim gain goes down. As the value of V goes up, the reclaim gain also goes down. The partial block with the highest value of reclaim gain is selected in the step 703 as the reclaim block. Other mathematical expressions can alternately be used to define a reclaim gain in terms of E and V that balance the detriment to system operation of containing valid data and the benefit of having erased capacity. The reclaim gain may be calculated each time there is a change in the block, such as each time data are written into its erased capacity, and stored as part of the information maintained by file directory or FIT.

Figures 31, 33:
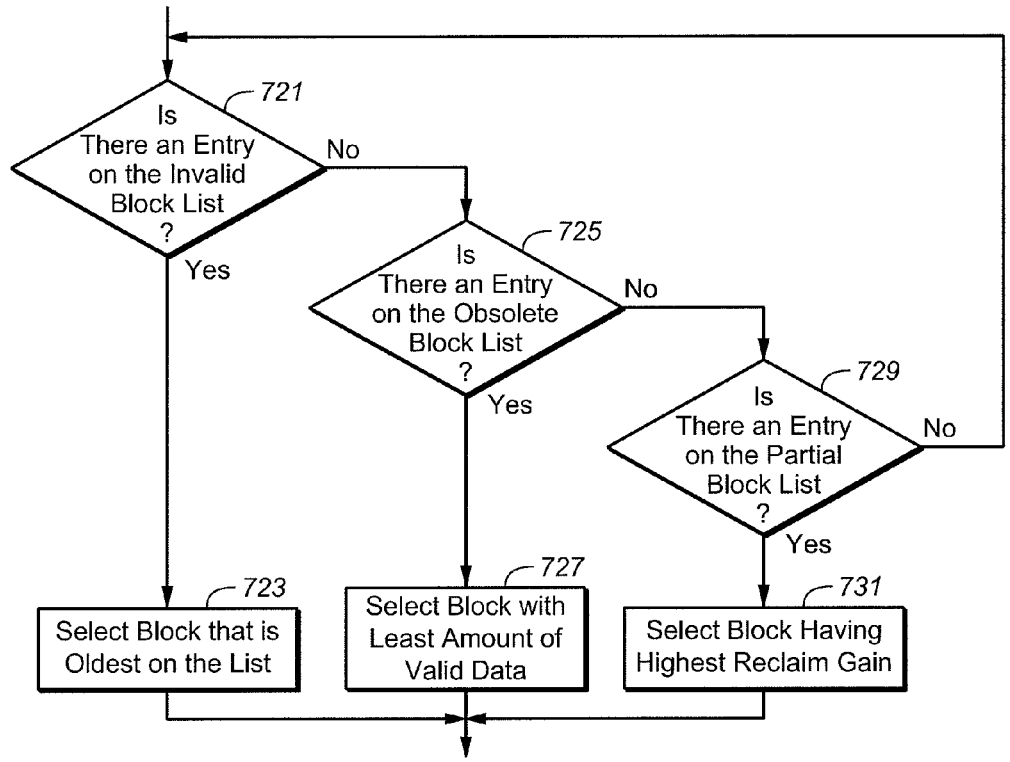
FIG. 31 provides details of a specific embodiment that carries out one of the steps of the flowchart of FIG. 29.
FIG. 33 is a table defining the block types placed on two block lists of yet another embodiment.

This second embodiment is illustrated in FIG. 31, which shows a method of selecting a reclaim block (step 703 of FIG. 29) from separate partial, obsolete and invalid block lists (as maintained by step 701 of FIG. 29). A step 721 first determines whether there is a block listed on the invalid block list. If there are multiple such blocks, the block that has been on the list the longest is selected by a step 723 as the reclaim block. If there is no block on the invalid block list, then it is determined by a step 725 whether there is an entry on the obsolete block list. If so, in the case where more than one block is on the obsolete block list, the block having the least amount of valid data is selected by a step 727 as the reclaim block. If it is determined by the step 725 that there is no entry on the obsolete block list, then the partial block list is consulted in a step 729. When there is more than one block on the partial block list, the one having the highest reclaim gain is selected as the reclaim block. The reclaim gain takes into account the amount of valid data and erased capacity in the block, such as by using equation (1) above. If there is nothing on the partial block list, the process is repeated, by returning to the step 721, until a block appears on one of the lists. After the selection of a reclaim block, the processing proceeds to step 705 of FIG. 29.

Figure 32:
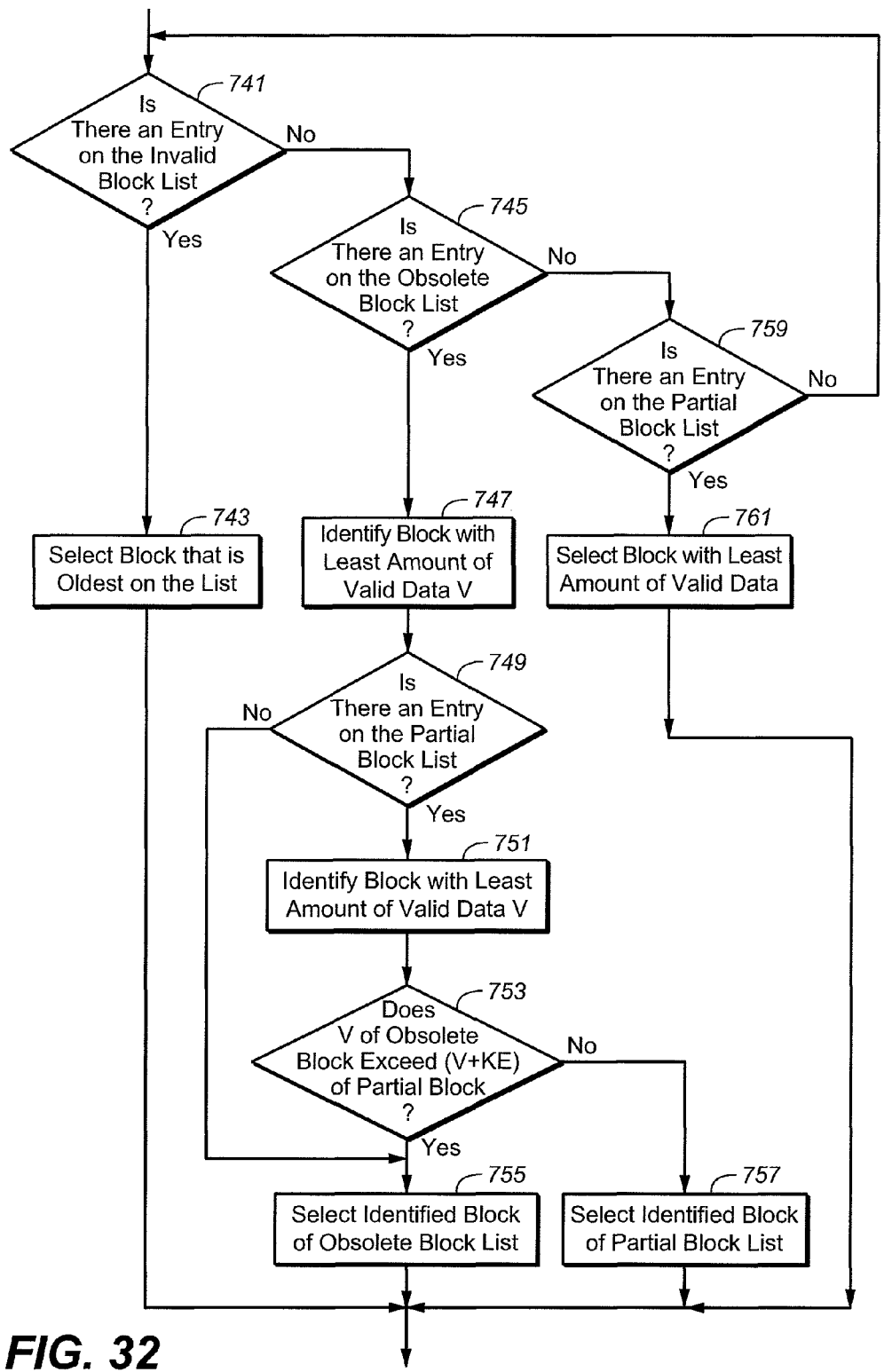
FIG. 32 provides details of an alternate embodiment to execute the same step of the flowchart of FIG. 29.

A third embodiment is shown by a flowchart of FIG. 32. Execution of the step 703 of FIG. 29 also starts by a step 741 that looks for an entry on the invalid block list maintained by the step 701 of FIG. 29. If there is more than one entry on the invalid block list, the oldest is selected by a step 743 of FIG. 32 to be the reclaim block. If there is no entry on the invalid block list, a next step 745 determines whether there is an entry on the obsolete block list. If so, subsequent steps differ from the embodiment of FIG. 31 in that, if there is also at least one entry on the partial block list, it is determined whether it is best to select the reclaim block from the obsolete or partial block lists.

A step 747 of FIG. 32 identifies the block on the obsolete block list that contains the least amount of valid data. It is then determined whether at least one block exists on the partial block list, by a step 749, and, if so, the block with the least amount of valid data is identified, in a step 751. A next step 753 then makes a choice between the one block identified from the obsolete block list and the one block identified on the partial block list. For this purpose, a quantity (V+kE) is calculated for the block identified from the partial block list in the step 751, the terms V, E and k being the same as used above. It is this quantity that is compared with the amount V of valid data in the block identified in step 747 from the obsolete block list. If the (V+kE) quantity for the partial block is greater than V of the obsolete block, then the obsolete block is chosen as the reclaim block, in a step 755. But if the V of the obsolete block is greater than the (V+kE) quantity of the identified partial block, then the partial block is selected in a step 757 as the reclaim block.

By adding the erased capacity quantity kE of the identified partial block to its valid data V before comparing with only the valid data V of the identified obsolete block, the process is biased in favor of selecting the obsolete block. An identified partial block with the same amount of valid data as an identified obsolete block will be retained since it is still has a potential use to store data in its erased capacity. Indeed, a partial block having an amount of valid data that is less than that of an obsolete block by an amount kE will be retained.

Returning to the step 745 of FIG. 32, if there is no entry on the obsolete block list, then it is determined in a step 759 whether there is a block listed on the partial block list. If not, the process returns to the step 741 to be repeated until a block is placed on one of the three lists. If there are multiple partial blocks listed, then, in a step 761, the block having the least amount of valid data is selected as the reclaim block. Alternatively, the partial block may be selected by use of the reclaim gain as described with respect to step 731 of the second embodiment (FIG. 31).

The third embodiment may alternatively make use of only two lists. The first list is an obsolete block list that contains entries for blocks that contain obsolete data and no erased capacity. Rather than using a separate invalid block list as show in FIG. 32, both invalid and obsolete blocks are placed on a single "obsolete" block list. The blocks may optionally contain valid data. Each entry in the list has a field containing a value defining the amount of valid data in the block to which it relates. The entries in the list are ordered according to the values in these fields. Blocks containing obsolete data and no valid data (invalid blocks) are therefore grouped together at the head of this first list.

The second list in this alternative to the third embodiment is a partial block list that contains entries for blocks that contain some erased storage capacity. The blocks may optionally contain valid data. Each entry in the list has a field containing a value defining the amount of valid data in the block to which it relates. The entries in the list are ordered according to the values in these fields. A block may be selected from the head (block with the least amount of invalid data) of either the first or second list by the technique of step 753 of FIG. 32.

A table of FIG. 33 sets forth details of the types of blocks that are placed on the partial and obsolete block lists for a reclaim operation according to this modification of the third embodiment. To be placed on the partial block list, a block contains both valid data and erased capacity. It does not matter whether there is any obsolete data in the block. To be placed on the obsolete block list, the block contains obsolete data and either valid data or erased capacity but not both.

CONCLUSION

Although the various aspects of the present invention have been described with respect to exemplary embodiments thereof, it will be understood that the present invention is entitled to protection within the full scope of the appended claims.

It is claimed:

1. A method of assigning addresses to data of file objects within a continuous logical address space, comprising:

divide the continuous logical address space into logical blocks of addresses, said logical blocks having a capacity, maintain at least one list including logical blocks that individually contain addresses assigned to an amount of valid data less than a the capacity of the logical blocks, select a logical block from said at least one list, copy the addresses assigned to valid data from the selected logical block into another logical block, and thereafter utilize the selected logical block for storing addresses for other data, wherein selecting a logical block includes selecting the logical block from said at least one list that has the least amount of valid data with assigned addresses in such logical block relative to the amount of valid data with assigned addresses in other logical blocks on the list.

2. The method of claim 1, wherein selecting a logical block from said at least one list additionally includes selecting the logical block from said at least one list on the basis of an amount of unused storage capacity therein relative to the amount of unused storage capacity in other logical blocks on said at least one list.

3. A method of managing a continuous logical address space at an interface, comprising:

dividing the logical address space into logical blocks of distinct addresses, initially designating addresses of data of individual file objects to be within certain first logical block of the logical blocks, and thereafter redesignating addresses for at least some of the data of at least one of the individual file objects in at least one second logical block different than the first logical block initially designated, so that the redesignated addresses of said at least some of the data of at least one of the individual file objects in the second logical block are different from the initially designating addresses within the first logical block.

4. The method of claim 3, wherein the redesignating addresses includes doing so without changing said at least some of the data of at least one of the individual file objects.

* * * * *